(12) United States Patent
Ueda et al.

(10) Patent No.: US 10,749,396 B2
(45) Date of Patent: Aug. 18, 2020

(54) ARMATURE WINDING OF ROTATING ELECTRICAL MACHINE

(71) Applicant: KABUSHIKI KAISHA TOSHIBA, Minato-ku (JP)

(72) Inventors: Takashi Ueda, Yokohama (JP); Masafumi Fujita, Yokohama (JP); Tadashi Tokumasu, Tokyo (JP); Masashi Kobayashi, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 587 days.

(21) Appl. No.: 15/492,496

(22) Filed: Apr. 20, 2017

(65) Prior Publication Data

US 2017/0310182 A1 Oct. 26, 2017

(30) Foreign Application Priority Data

Apr. 26, 2016 (JP) .................. 2016-088276

(51) Int. Cl.
*H02K 3/28* (2006.01)
*H02K 3/12* (2006.01)
(52) U.S. Cl.
CPC .................. *H02K 3/28* (2013.01); *H02K 3/12* (2013.01); *H02K 2213/03* (2013.01)
(58) Field of Classification Search
CPC ........ H02K 3/28; H02K 3/12; H02K 2213/03; H02K 3/38; H02K 3/46; H02K 3/325; H02K 3/48; H02K 3/50; H02K 3/52; H02K 3/521; H02K 3/522

USPC .................................................. 310/179–208
See application file for complete search history.

(56) References Cited

U.S. PATENT DOCUMENTS

| 2,731,576 | A | * | 1/1956 | McElligott | ............... | H02K 3/28 310/202 |
| 2,745,029 | A | * | 5/1956 | McElligott | ............... | H02K 3/28 310/202 |
| 2,778,962 | A | | 1/1957 | Taylor | | |
| 2,778,963 | A | | 1/1957 | Habermann, Jr. | | |
| 3,408,517 | A | * | 10/1968 | Willyoung | ............... | H02K 3/28 310/198 |
| 3,652,888 | A | * | 3/1972 | Harrington | ............... | H02K 3/28 310/198 |

(Continued)

FOREIGN PATENT DOCUMENTS

| JP | 5367436 B2 | 12/2013 |
| JP | 2017-63579 A | 3/2017 |
| JP | 2017-63580 A | 3/2017 |

*Primary Examiner* — Tulsidas C Patel
*Assistant Examiner* — Ahmed Elnakib
(74) *Attorney, Agent, or Firm* — Oblon, McClelland, Maier & Neustadt, L.L.P.

(57) ABSTRACT

According to one embodiment, there is provided a three-phase even-numbered-pole two-layered armature winding housed in forty five slots per pole provided in a laminated iron core. Coil pieces corresponding to first and second parallel circuits are arranged in the first phase belt, coil pieces corresponding to fourth and fifth parallel circuits are arranged in the second phase belt, coil pieces corresponding to the third parallel circuit are arranged in the first and second phase belts, and the upper coil pieces and the lower coil pieces of each parallel circuit are placed in same-numbered positions from a pole center.

19 Claims, 18 Drawing Sheets

(56) References Cited

U.S. PATENT DOCUMENTS

| | | | |
|---|---|---|---|
| 2009/0096312 A1* | 4/2009 | Tokumasu | H02K 3/28 310/198 |
| 2009/0195105 A1* | 8/2009 | Tokumasu | H02K 3/28 310/198 |
| 2016/0322878 A1 | 11/2016 | Tokumasu et al. | |
| 2017/0093240 A1* | 3/2017 | Ueda | H02K 1/16 |
| 2017/0093241 A1* | 3/2017 | Fujita | H02K 3/28 |
| 2017/0170698 A1* | 6/2017 | Tanaka | H02K 3/28 |
| 2017/0310182 A1* | 10/2017 | Ueda | H02K 3/28 |

* cited by examiner

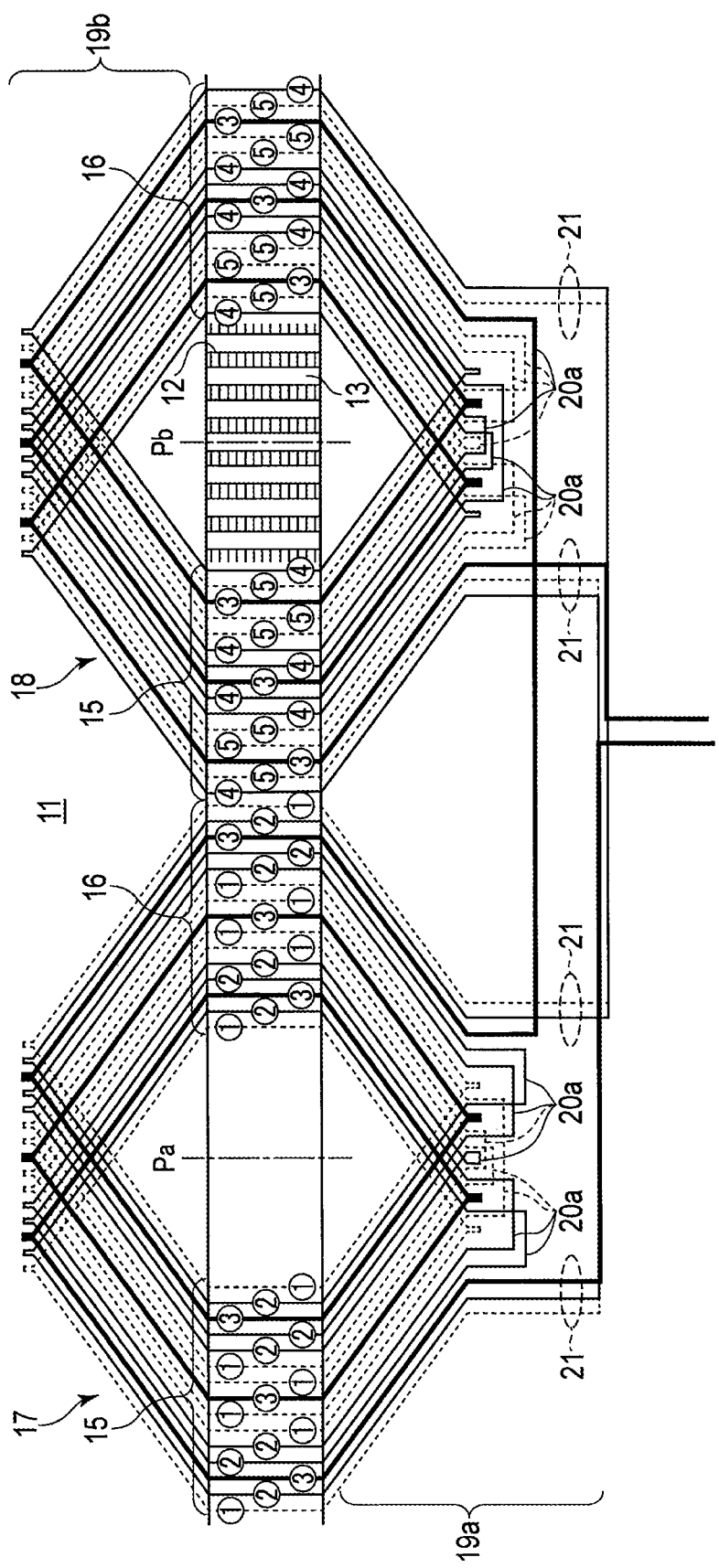
F I G. 3

ARMATURE WINDING OF ROTATING ELECTRICAL MACHINE

CROSS-REFERENCE TO RELATED APPLICATIONS

This application is based upon and claims the benefit of priority from Japanese Patent Application No. 2016-088276, filed Apr. 26, 2016, the entire contents of which are incorporated herein by reference.

FIELD

Embodiments described herein relate generally to an armature winding having five parallel circuits applied to a 3-phase rotating electrical machine having forty five slots per pole.

BACKGROUND

In a large-capacity rotating electrical machine, an armature winding is provided with upper and lower coil pieces arranged in slots of a laminated iron core in a two-layer structure, and parallel circuits are connected in series, thereby increasing the generated voltage and machine capacity. However, as a voltage of an armature winding is increased, the thickness of the main insulation of an armature winding is increased to withstand such higher voltage. As a result, a cross-sectional area of a conducting portion is reduced, and a current density increases, so that a loss increases.

Particularly, in an indirect cooling type machine in which the armature winding is cooled from an outer side of the main insulation, as the thickness of the main insulation increases, a thermal resistance increases, and a temperature disadvantageously increases in the armature winding. For this reason, an armature winding is divided into multiple parallel circuits, thereby decreasing the voltage of the armature winding and the thickness of the main insulation, reducing the loss, and increasing the cooling capacity, while maintaining the machine capacity. Further, in an indirect cooling type large-capacity machine, it is common to increase the number of slots in the armature winding to increase a cooling cycle of the armature winding. Therefore, an armature winding having three or more parallel circuits is desirable.

If the armature winding having three or more parallel circuits is applied to a 2-pole machine, the voltages generated by each of the parallel circuits are not completely equated, and a circulating current is generated between the parallel circuits, and a loss in the armature winding increases disadvantageously.

In order to reduce such a loss caused by the circulating current, it is necessary to minimize imbalance between the voltages generated by the parallel circuits. For this purpose, a special consideration is required in placement of coils of each parallel circuit in each phase belt.

An example of improvement in the placement of coils will be described with reference to FIG. 17, which is a developed perspective view illustrating a part of an armature winding for one phase.

FIG. 17 illustrates an example of an armature winding having four parallel circuits applicable to a 3-phase 2-pole 72-slot rotating electrical machine as discussed in Taylor's patent.

Although FIG. 17 illustrates a part of an armature winding for only one phase, it is obvious that the same configuration as that of FIG. 17 may be similarly applied to the other two phases shifted by 120° and 240°.

In Taylor's patent, assuming that the parallel circuits are numbered "1 to 4," twelve parallel circuits of upper and lower coil pieces 15 and 16 of a first phase belt 17 are numbered "122121121221" sequentially from a pole center. Similarly, parallel circuits of upper and lower coil pieces 15 and 16 of a second phase belt 18 are numbered "344343343443" sequentially from the pole center. This decreases a deviation of voltage (an absolute value of a deviation from an average phase voltage) and a deviation of phase difference (a deviation of phase angle from an average phase voltage) of each parallel circuit.

To realize such a connection, in FIG. 17, fourteen jumper wires 20a per phase are provided in a connection side coil end 19a.

Meanwhile, a technique for reducing deviations in the voltage and the phase angle between each parallel circuit is discussed in Habermann's patent.

In Habermann's patent, a voltage deviation between each parallel circuit is rated at 0.4% or smaller, and a phase angle deviation is rated at 0.15° or smaller. However, in Taylor's patent, the voltage deviation is rated at 0.12%, and the phase angle deviation is rated at 0°. It is conceived that these values are highly balanced and sufficiently efficient to decrease a circulating current under the same condition.

The connection method of Taylor's patent described above provides an armature winding having four parallel circuits applicable to a 3-phase 2-pole 72-slot rotating electrical machine. However, in an indirect cooling type large-capacity rotating electrical machine, it is necessary for the armature winding to have a greater number of parallel circuits. In this regard, as illustrated in FIG. 18, a connection method for an armature winding of a 2-pole 72-slot rotating electrical machine having six parallel circuits is known in the art. However, although this connection method provides an armature winding having six parallel circuits applicable to a 3-phase 2-pole 72-slot rotating electrical machine, its application is limited only to the 3-phase 2-pole 72-slot rotating electrical machine.

In the future, it is anticipated that a novel large-capacity technology is employed in the indirect cooling type large-capacity rotating electrical machine, and this may increase the number of windings to obtain a satisfactory generation voltage. For this purpose, it is desired to implement an armature winding having a greater number of slots. For example, it is desired to implement an armature winding of a rotating electrical machine having five parallel circuits applied to a 3-phase rotating electrical machine having 45 slots per pole.

BRIEF DESCRIPTION OF THE DRAWINGS

FIG. 3 is a developed perspective view illustrating a part of an armature winding of a rotating electrical machine for two poles/one phase according to a third embodiment;

DETAILED DESCRIPTION

Hereinafter, embodiments will be described with reference to the accompanying drawings.

In general, according to one embodiment, there is provided a three-phase even-numbered-pole two-layered armature winding housed in forty five slots per pole provided in a laminated iron core of a rotating electrical machine, comprising: five parallel circuits provided for each phase of the winding and divided into a pair of phase belts including first and second phase belts, each parallel circuit including upper and lower coil pieces which are connected to each other in series in a connection side coil end and a counter-connection side coil end, wherein coil pieces corresponding to first and second parallel circuits are arranged in the first phase belt, coil pieces corresponding to fourth and fifth parallel circuits are arranged in the second phase belt, coil pieces corresponding to the third parallel circuit are arranged in the first and second phase belts, and the upper coil pieces and the lower coil pieces of each parallel circuit are placed in same-numbered positions from a pole center.

First Embodiment

First, a first embodiment will be described with reference to FIG. 1.

Figure 1:
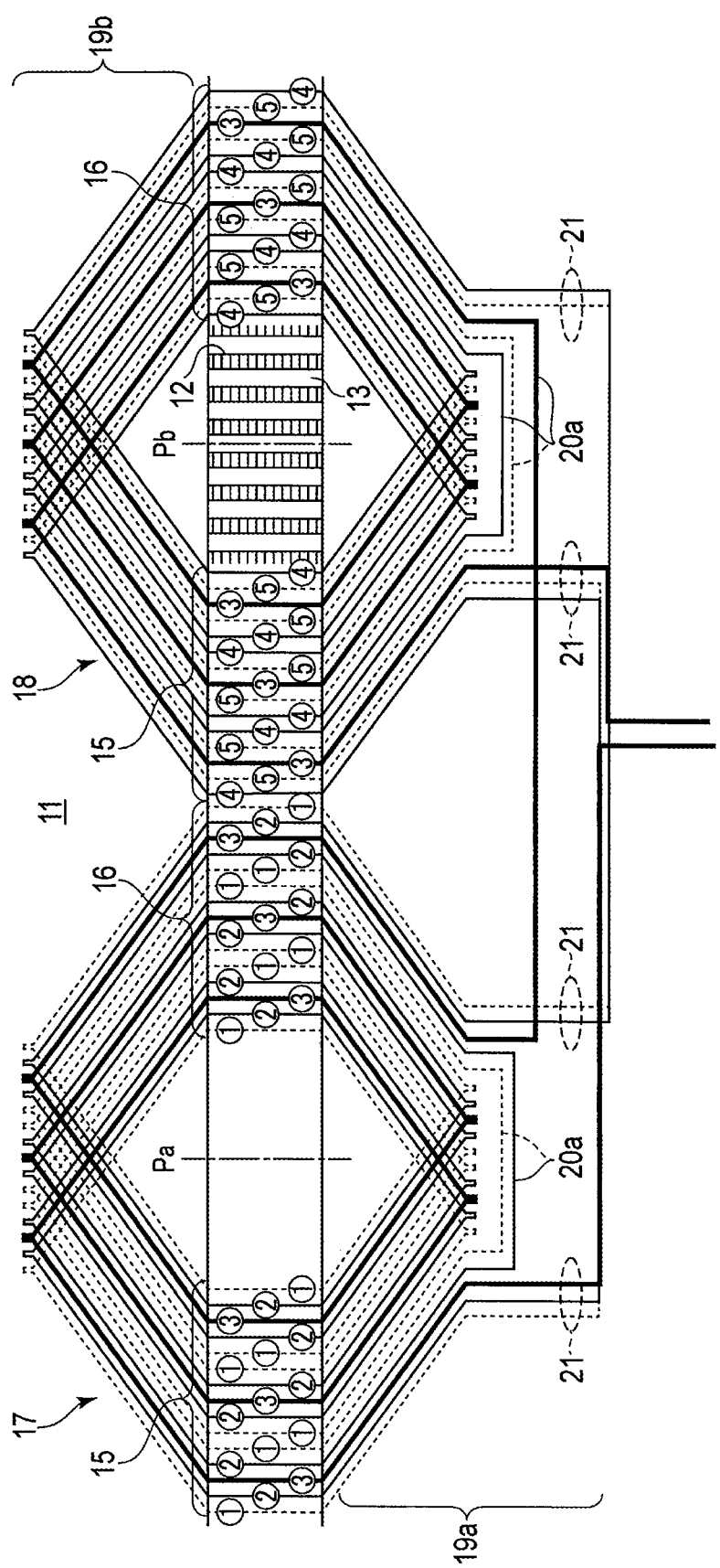
FIG. 1 is a developed perspective view illustrating a part of an armature winding of a rotating electrical machine for two poles/one phase according to a first embodiment.

FIG. 1 is a developed perspective view illustrating a part of an armature winding of a rotating electrical machine for two poles/one phase according to a first embodiment.

An armature 11 of the rotating electrical machine of FIG. 1 has a 3-phase even-numbered-pole 2-layered armature winding. In the example of FIG. 1, a laminated armature core 12 is provided with forty five slots 13 per pole. The 2-pole 3-phase armature winding that forms five parallel circuits is housed in the slots 13 in a two-layer structure. In the case of a 3-phase 2-pole rotating electrical machine (2-pole machine), the total number of slots is "90."

The armature winding of each phase has upper coil pieces 15 housed in the upper part of the slot 13 around a pole center Pb and lower coil pieces 16 housed in the lower part of the slot 13 around a pole center Pa. The ends of the upper and lower coil pieces 15 and 16 are connected in series at a connection side coil end 19a connected to a lead-out portion of the winding, and at a counter-connection side coil end 19b located axially opposite to the connection side coil end 19a and not connected to the lead-out portion of the winding. Further, the armature winding has a first phase belt 17 in which the upper and lower coil pieces 15 and 16 are housed in the fifteen slots 13 provided in the armature core 12, and a second phase belt 18 in which the upper and lower coil pieces 15 and 16 are housed in the fifteen slots 13.

Here, each of the first and second phase belts refers to a group of coils assigned with the same phase by dividing each of three phases into two parts and housing the upper and lower coil pieces in 45 slots per pole of the laminated iron core (armature core) in a two-layer structure and sequentially connecting them in series.

The armature winding of each phase has five parallel circuits. The parallel circuits are given circled numbers 1, 2, 3, 4, and 5 for identification in the drawings. Note that the circuit numbers are assigned to identify the parallel circuits for convenience of explanation, and may be given any symbol in any order.

In each phase belt 17 and 18, the upper coil piece 15 is connected to the corresponding lower coil piece 16 in the connection side coil end 19a and the counter-connection side coil end 19b apart by a predetermined coil pitch to form five parallel circuits. The parallel circuits are connected in parallel through the lead-out connection conductor 21 provided in the connection side coil end 19a to form an armature winding 14. In FIG. 1, the coil pitch is set to a small value of "⅔" by way of example. This coil pitch is just for easy understanding, and may be set to any other value without limitation.

As illustrated in FIG. 1, five jumper wires 20a per phase are provided in the connection side coil ends 19a of the phase belts 17 and 18. In addition, in the first phase belt 17, the circuits of the upper coil pieces 15 and the lower coil pieces 16 are numbered "1, 2, 3, 2, 1, 1, 2, 3, 2, 1, 1, 2, 3, 2, 1" sequentially from the pole center. In the second phase belt 18, the circuits of the upper coil pieces 15 and the lower coil pieces 16 are numbered "4, 5, 3, 5, 4, 4, 5, 3, 5, 4, 4, 5, 3, 5, 4" sequentially from the pole center.

As a result, when relative positions of the upper and lower coil pieces 15 and 16 in each phase belt are expressed by positions from the pole center, the upper and lower coil pieces 15 and 16 of each parallel circuit are placed as shown in Table 1.

TABLE 1

| Relative positions from pole center | | 1 | 2 | 3 | 4 | 5 | 6 | 7 | 8 |
|---|---|---|---|---|---|---|---|---|---|
| Parallel circuits 1, 4 | Upper coil piece | 1 | | | | | 1 | 1 | |
| | Lower coil piece | 1 | | | | | 1 | 1 | |
| Parallel circuits 2, 5 | Upper coil piece | | 1 | | 1 | | | 1 | |
| | Lower coil piece | | 1 | | 1 | | | 1 | |
| Parallel circuit 3 | Upper coil piece | | | 1 | | | | | 1 |
| | Lower coil piece | | | 1 | | | | | 1 |

| Relative positions from pole center | | 9 | 10 | 11 | 12 | 13 | 14 | 15 |
|---|---|---|---|---|---|---|---|---|
| Parallel circuits 1, 4 | Upper coil piece | | 1 | 1 | | | | 1 |
| | Lower coil piece | | 1 | 1 | | | | 1 |
| Parallel circuits 2, 5 | Upper coil piece | 1 | | | 1 | | 1 | |
| | Lower coil piece | 1 | | | 1 | | 1 | |
| Parallel circuit 3 | Upper coil piece | | | | | 1 | | |
| | Lower coil piece | | | | | 1 | | |

As shown in Table 1, for each of the first and fourth parallel circuits, six upper and lower coil pieces 15 and 16 are placed in the 1st, 5th, 6th, 10th, 11th, and 15th positions from the pole center. For each of the second and fifth parallel circuits, six upper and lower coil pieces 15 and 16 are placed in the 2nd, 4th, 7th, 9th, 12th, and 14th positions from the pole center. For the third parallel circuit, three upper and lower coil pieces 15 and 16 are placed in the 3rd, 8th, and 13th positions from the pole center.

Next, imbalance of the voltage generated in one phase will be described. Here, the following definition is generally employed as a means for numerically evaluating the degree of imbalance. Specifically, the voltage expressed by "p.u." of only one of the multiple parallel circuits in one phase refers to a ratio between an open-circuit voltage of the corresponding parallel circuit and an average voltage (phase voltage) in the entire phase, and indicates a degree of imbalance in the voltage between the corresponding parallel circuit and the entire phase. Similarly, a phase angle deviation between the open-circuit voltage generated in one parallel circuit and the phase voltage indicates a degree of imbalance in the phase angle of the voltage between the corresponding parallel circuit and the entire phase.

Table 2 shows the degree of balance in the voltage generated from the armature winding according to the first embodiment. However, in the first embodiment, the degree of balance varies depending on the coil pitch. Therefore, in Table 2, the coil pitch is set to "37/45 (82.22%)." As shown in Table 2, in the armature winding according to the first embodiment, a voltage deviation (a deviation of a p.u. voltage from 1.0) is 0.49% at most, and a phase angle deviation is 0.00°. It is recognized that the armature winding according to the first embodiment satisfies the requirement regarding the voltage deviation and phase angle deviation of Habermann's patent, in which the voltage deviation be set to 0.4% and the phase angle deviation be set to 0.15' or smaller.

TABLE 2

| Parallel circuit | 1 | 2 | 3 | 4 | 5 |
|---|---|---|---|---|---|
| Voltage [p.u.] | 0.9951 | 1.0024 | 1.0049 | 0.9951 | 1.0024 |
| Voltage phase [°] | 0.0000 | 0.0000 | 0.0000 | 0.0000 | 0.0000 |

Table 3 shows a change in the maximum values of the voltage deviation and the phase angle deviation depending on a coil pitch according to the first embodiment. While Table 3 shows a case where the coil pitch is within a range of 35/45 to 39/45, according to the first embodiment, the voltage deviation and the phase angle deviation are constant regardless of the coil pitch.

TABLE 3

| Coil pitch | 35/45 | 36/45 | 37/45 | 38/45 | 39/45 |
|---|---|---|---|---|---|
| Voltage Deviation [%] | 0.4891 | 0.4891 | 0.4891 | 0.4891 | 0.4891 |
| Phase angle Deviation [°] | 0.0000 | 0.0000 | 0.0000 | 0.0000 | 0.0000 |

As described above, according to the first embodiment, it is possible to realize the degree of balance satisfying the requirement of Habermann's patent regarding the voltages of the parallel circuits and reduce a circulating current.

Note that the embodiment is not limited to the configuration described above. For example, the lead-out positions may be set differently from those described above, or the coil pieces located in electrically equivalent positions may be exchanged between the parallel circuits 1 and 4.

Second Embodiment

Next, a second embodiment will be described with reference to FIG. 2. Here, the parts common to those of the first embodiment described above (FIG. 1) will not be repeatedly described, and the description will focus on the different parts.

Figure 2:
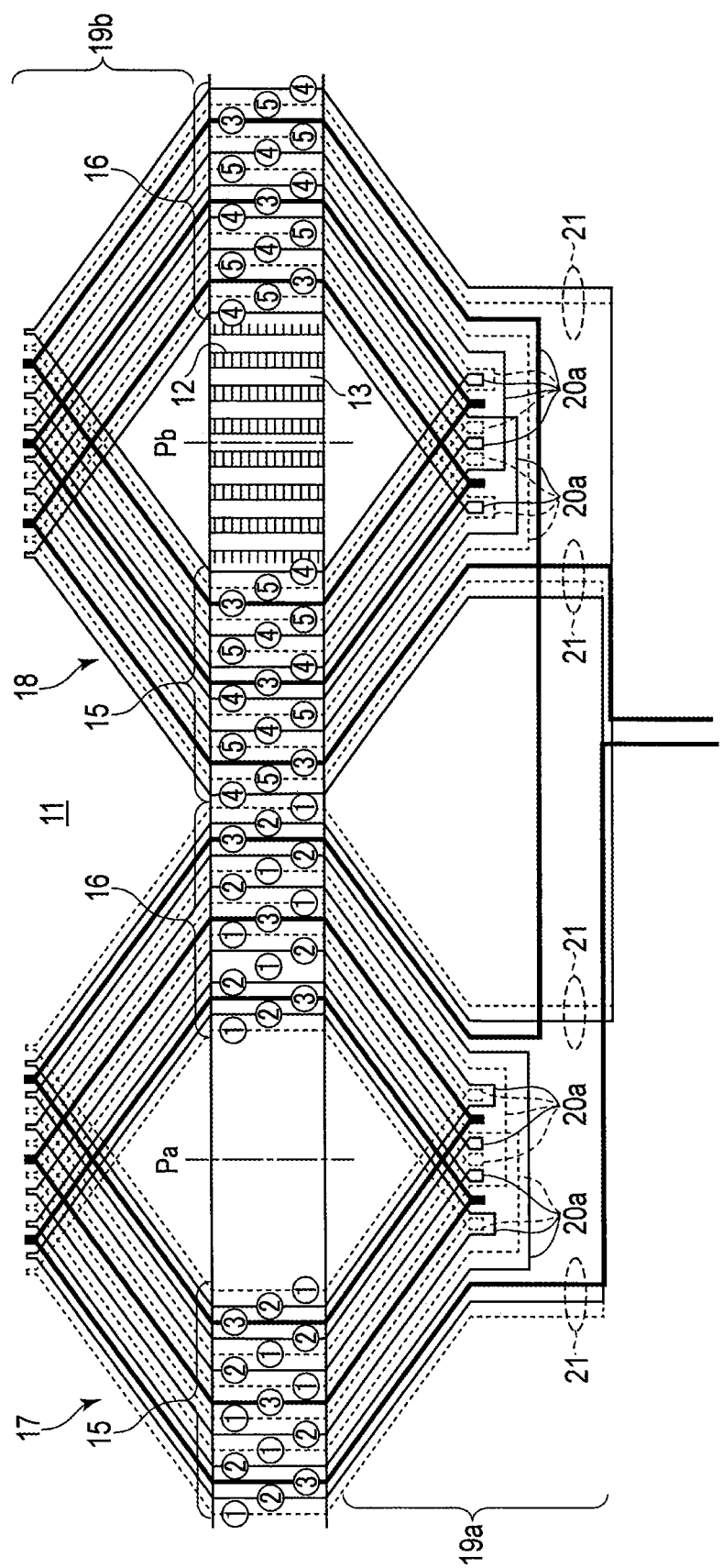
FIG. 2 is a developed perspective view illustrating a part of an armature winding of a rotating electrical machine for two poles/one phase according to a second embodiment.

FIG. 2 is a developed perspective view illustrating a part of an armature winding of a rotating electrical machine for two poles/one phase according to a second embodiment.

As illustrated in FIG. 2, twenty one jumper wires 20a per phase are provided in the connection side coil ends 19a of the phase belts 17 and 18. In addition, in the first phase belt 17, the circuits of the upper and lower coil pieces 15 and 16 are numbered "1, 2, 3, 2, 1, 2, 1, 3, 1, 2, 1, 2, 3, 2, 1" sequentially from the pole center. In the second phase belt 18, the circuits of the upper and lower coil pieces 15 and 16 are numbered "4, 5, 3, 5, 4, 5, 4, 3, 4, 5, 4, 5, 3, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 4.

TABLE 4

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | 1 | | 1 | |
| | Lower coil piece | 1 | | | | 1 | | 1 | |
| Parallel circuits 2, 5 | Upper coil piece | | 1 | | 1 | | 1 | | |
| | Lower coil piece | | 1 | | 1 | | 1 | | |
| Parallel circuit 3 | Upper coil piece | | | 1 | | | | | 1 |
| | Lower coil piece | | | 1 | | | | | 1 |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | 1 | | | | | 1 |
| | Lower coil piece | 1 | 1 | | | | | 1 |
| Parallel circuits 2, 5 | Upper coil piece | | | 1 | 1 | | 1 | |
| | Lower coil piece | | | 1 | 1 | | 1 | |
| Parallel circuit 3 | Upper coil piece | | | | | 1 | | |
| | Lower coil piece | | | | | 1 | | |

As shown in Table 4, for each of the first and fourth parallel circuits, six upper and lower coil pieces 15 and 16 are placed in the 1st, 5th, 7th, 9th, 11th, and 15th positions from the pole center. For each of the second and fifth parallel circuits, six upper and lower coil pieces 15 and 16 are placed in the 2nd, 4th, 6th, 10th, 12th, and 14th positions from the pole center. For the third parallel circuit, three upper and lower coil pieces 15 and 16 are placed in the 3rd, 8th, and 13th positions from the pole center.

Table 5 shows the degree of balance of the voltage generated from the armature winding according to the second embodiment. Meanwhile, according to the second embodiment, the degree of balance varies depending on a coil pitch. Therefore, in Table 5, the coil pitch is set to "37/45 (82.22%)." As shown in Table 5, in the armature winding according to the second embodiment, a voltage deviation (a deviation of a p.u. voltage from 1.0) is "0.49%" at most, and a phase angle deviation is "0.00°." It is recognized that these values roughly satisfy the requirement of Habermann's patent.

TABLE 5

| | Parallel circuit | | | | |
|---|---|---|---|---|---|
| | 1 | 2 | 3 | 4 | 5 |
| Voltage [p.u.] | 0.9977 | 0.9999 | 1.0049 | 0.9977 | 0.9999 |
| Voltage phase [°] | 0.0000 | 0.0000 | 0.0000 | 0.0000 | 0.0000 |

Table 6 shows a change of the maximum values of the voltage deviation and the phase angle deviation depending on a coil pitch according to the second embodiment. While Table 6 shows a case where the coil pitch is within a range of "35/45 to 39/45," according to the second embodiment, the voltage deviation and the phase angle deviation are constant regardless of the coil pitch.

TABLE 6

| | Coil pitch | | | | |
|---|---|---|---|---|---|
| | 35/45 | 36/45 | 37/45 | 38/45 | 39/45 |
| Voltage Deviation [%] | 0.4891 | 0.4891 | 0.4891 | 0.4891 | 0.4891 |
| Phase angle Deviation [°] | 0.0000 | 0.0000 | 0.0000 | 0.0000 | 0.0000 |

As described above, according to the second embodiment, it is possible to realize the degree of balance satisfying the requirement of Habermann's patent regarding the voltages of the parallel circuits and reduce a circulating current.

Note that the embodiment is not limited to the configuration described above. For example, the lead-out positions may be set differently from those described above, or the coil pieces located in electrically equivalent positions may be exchanged between the parallel circuits 1 and 4.

Third Embodiment

Next, a third embodiment will be described with reference to FIG. 3. Here, the parts common to those of the first embodiment described above (FIG. 1) will not be repeatedly described, and the description will focus on the different parts.

FIG. 3 is a developed perspective view illustrating a part of an armature winding of a rotating electrical machine for two poles/one phase according to a third embodiment.

As illustrated in FIG. 3, seventeen jumper wires 20a per phase are provided in the connection side coil ends 19a of the phase belts 17 and 18. In addition, in the first phase belt 17, the circuits of the upper and lower coil pieces 15 and 16 are numbered "1, 2, 3, 2, 2, 1, 1, 3, 1, 1, 2, 2, 3, 2, 1" sequentially from the pole center. In the second phase belt 18, the circuits of the upper and lower coil pieces 15 and 16 are numbered "4, 5, 3, 5, 5, 4, 4, 3, 4, 4, 5, 5, 3, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 7.

TABLE 7

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | | 1 | 1 | |
| | Lower coil piece | 1 | | | | | 1 | 1 | |
| Parallel circuits 2, 5 | Upper coil piece | | 1 | | 1 | 1 | | | |
| | Lower coil piece | | 1 | | 1 | 1 | | | |
| Parallel circuit 3 | Upper coil piece | | | 1 | | | | | 1 |
| | Lower coil piece | | | 1 | | | | | 1 |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | 1 | | | | | 1 |
| | Lower coil piece | 1 | 1 | | | | | 1 |
| Parallel circuits 2, 5 | Upper coil piece | | | 1 | 1 | | 1 | |
| | Lower coil piece | | | 1 | 1 | | 1 | |
| Parallel circuit 3 | Upper coil piece | | | | | 1 | | |
| | Lower coil piece | | | | | 1 | | |

As shown in Table 7, for each of the first and fourth parallel circuits, six upper and lower coil pieces 15 and 16 are placed in the 1st, 6th, 7th, 9th, 10th, and 15th positions from the pole center. For each of the second and fifth parallel circuits, six upper and lower coil pieces 15 and 16 are placed in the 2nd, 4th, 5th, 11th, 12th, and 14th positions from the pole center. For the third parallel circuit, three upper and lower coil pieces 15 and 16 are placed in the 3rd, 8th, and 13th positions from the pole center.

Table 8 shows the degree of balance of the voltage generated from the armature winding according to the third embodiment. Meanwhile, according to the third embodiment, the degree of balance varies depending on a coil pitch. Therefore, in Table 8, the coil pitch is set to "37/45 (82.22%)." As shown in Table 8, in the armature winding according to the third embodiment, a voltage deviation (a deviation of a p.u. voltage from 1.0) is "0.49%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 8

| | Parallel circuit | | | | |
|---|---|---|---|---|---|
| | 1 | 2 | 3 | 4 | 5 |
| Voltage [p.u.] | 1.0019 | 0.9957 | 1.0049 | 1.0019 | 0.9957 |
| Voltage phase [°] | 0.0000 | 0.0000 | 0.0000 | 0.0000 | 0.0000 |

Table 9 shows a change in the maximum values of the voltage deviation and the phase angle deviation depending on a coil pitch according to the third embodiment. While Table 9 shows a case where the coil pitch is within a range of "35/45 to 39/45," according to the third embodiment, the voltage deviation and the phase angle deviation are constant regardless of the coil pitch.

TABLE 9

| | Coil pitch | | | | |
|---|---|---|---|---|---|
| | 35/45 | 36/45 | 37/45 | 38/45 | 39/45 |
| Voltage Deviation [%] | 0.4891 | 0.4891 | 0.4891 | 0.4891 | 0.4891 |
| Phase angle Deviation [°] | 0.0000 | 0.0000 | 0.0000 | 0.0000 | 0.0000 |

As described above, according to the third embodiment, it is possible to realize the degree of balance satisfying the requirement of Habermann's patent regarding the voltages of the parallel circuits and reduce a circulating current.

Note that the embodiment is not limited to the configuration described above. For example, the lead-out positions may be set differently from those described above, or the coil pieces located in electrically equivalent positions may be exchanged between the parallel circuits 1 and 4.

Fourth Embodiment

Next, a fourth embodiment will be described with reference to FIG. 4. Here, the parts common to those of the first embodiment described above (FIG. 1) will not be repeatedly described, and the description will focus on the different parts.

Figure 4:
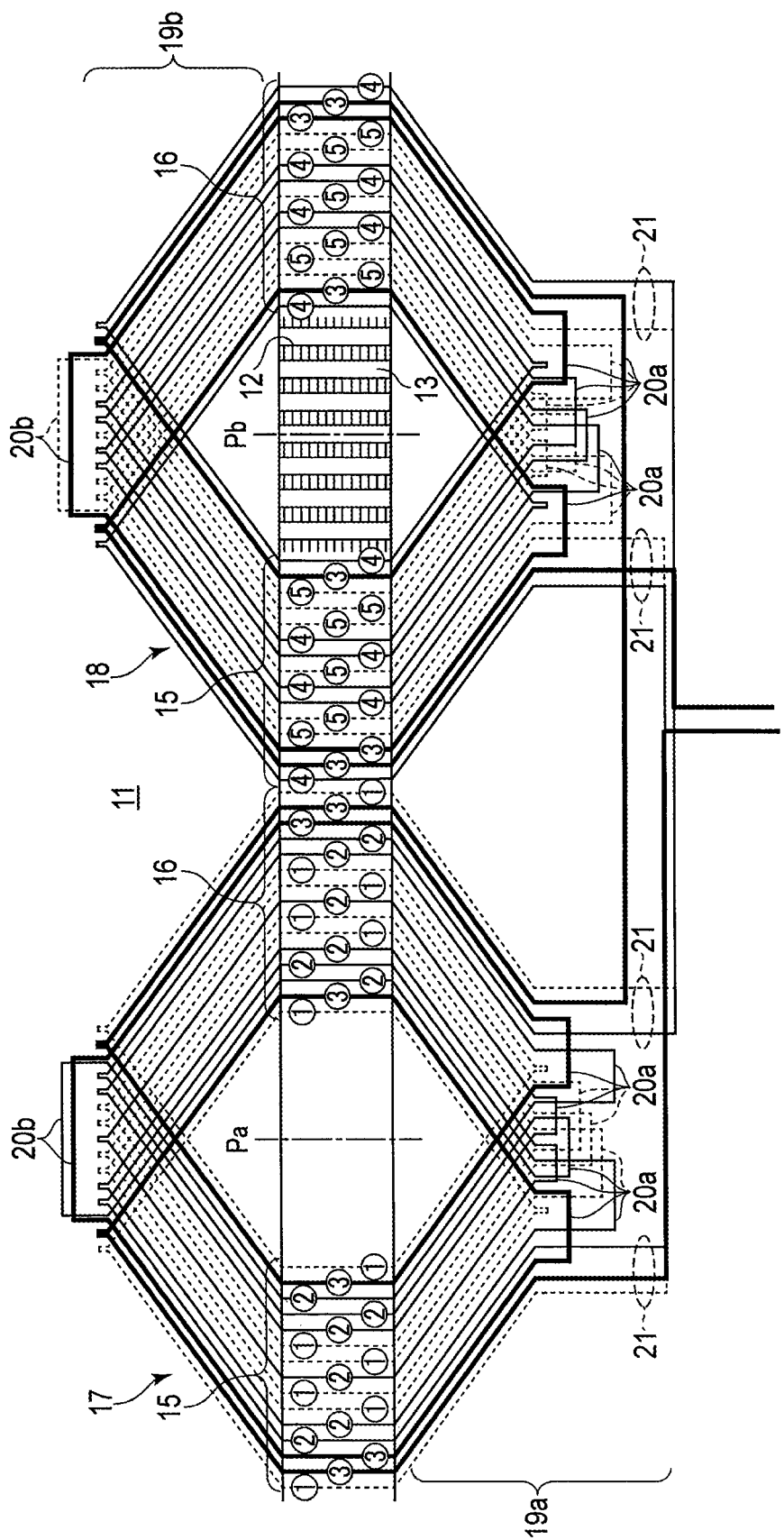
FIG. 4 is a developed perspective view illustrating a part of an armature winding of a rotating electrical machine for two poles/one phase according to a fourth embodiment.

FIG. 4 is a developed perspective view illustrating a part of an armature winding of a rotating electrical machine for two poles/one phase according to a fourth embodiment.

As illustrated in FIG. 4, twenty one jumper wires 20a per phase are provided in the connection side coil ends 19a of the phase belts 17 and 18, and four jumper wires 20b per phase are provided in the counter-connection side coil ends 19b. In addition, in the first phase belt 17, the circuits of the upper and lower coil pieces 15 and 16 are numbered "1, 3, 2, 2, 2, 1, 1, 2, 1, 1, 2, 2, 3, 3, 1" sequentially from the pole center. In the second phase belt 18, the circuits of upper and lower coil pieces 15 and 16 are numbered "4, 3, 5, 5, 5, 4, 4, 5, 4, 4, 5, 5, 3, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 10.

TABLE 10

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | | 1 | 1 | |
| | Lower coil piece | 1 | | | | | 1 | 1 | |
| Parallel circuits 2, 5 | Upper coil piece | | | 1 | 1 | 1 | | | 1 |
| | Lower coil piece | | | 1 | 1 | 1 | | | 1 |
| Parallel circuit 3 | Upper coil piece | | 1 | | | | | | |
| | Lower coil piece | | 1 | | | | | | |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | 1 | | | | | 1 |
| | Lower coil piece | 1 | 1 | | | | | 1 |
| Parallel circuits 2, 5 | Upper coil piece | | | 1 | 1 | | | |
| | Lower coil piece | | | 1 | 1 | | | |
| Parallel circuit 3 | Upper coil piece | | | | | 1 | 1 | |
| | Lower coil piece | | | | | 1 | 1 | |

As shown in Table 10, for each of the first and fourth parallel circuits, six upper and lower coil pieces 15 and 16 are placed in the 1st, 6th, 7th, 9th, 10th, and 15th positions from the pole center. For each of the second and fifth parallel circuits, six upper and lower coil pieces 15 and 16 are placed in the 3rd, 4th, 5th, 8th, 11th, and 12th positions from the pole center. For the third parallel circuit, three upper and lower coil pieces 15 and 16 are placed in the 2nd, 13th, and 14th positions from the pole center.

Table 11 shows the degree of balance in the voltage generated from the armature winding according to the fourth embodiment. However, in the fourth embodiment, the degree of balance varies depending on the coil pitch. Therefore, in Table 11, the coil pitch is set to "37/45 (82.22%)." As shown in Table 11, in the armature winding according to the fourth embodiment, a voltage deviation (a deviation of a p.u. voltage from 1.0) is 0.19% at most, and a phase angle deviation is 0.00°. It is recognized that the armature winding according to the fourth embodiment satisfies the requirement of Habermann's patent, in which the voltage deviation be set to 0.4% or smaller and the phase angle deviation be set to 0.15° or smaller.

TABLE 11

| | Parallel circuit | | | | |
|---|---|---|---|---|---|
| | 1 | 2 | 3 | 4 | 5 |
| Voltage [p.u.] | 1.0019 | 0.9982 | 0.9998 | 1.0019 | 0.9982 |
| Voltage phase [°] | 0.0000 | 0.0000 | 0.0000 | 0.0000 | 0.0000 |

Table 12 shows a change in the maximum values of the voltage deviation and the phase angle deviation depending on a coil pitch according to the fourth embodiment. When the coil pitch is "37/45," the degree of balance satisfies the requirement of Habermann's patent, in which the voltage deviation be "0.4%" or smaller, and the phase angle deviation be "0.15°" or smaller.

TABLE 12

| | Coil pitch | | | | |
|---|---|---|---|---|---|
| | 35/45 | 36/45 | 37/45 | 38/45 | 39/45 |
| Voltage Deviation [%] | 0.9038 | 0.4377 | 0.1888 | 0.4646 | 0.9035 |
| Phase angle Deviation [°] | 0.0000 | 0.0000 | 0.0000 | 0.0000 | 0.0000 |

As described above, according to the fourth embodiment, it is possible to realize the degree of balance satisfying the requirement of Habermann's patent regarding the voltages of the parallel circuits and reduce a circulating current.

Note that the embodiment is not limited to the configuration described above. For example, the lead-out positions may be set differently from those described above, or the coil pieces located in electrically equivalent positions may be exchanged between the parallel circuits 1 and 4.

Fifth Embodiment

Next, a fifth embodiment will be described with reference to FIG. 5. Here, the parts common to those of the first embodiment described above (FIG. 1) will not be repeatedly described, and the description will focus on the different parts.

Figure 5:
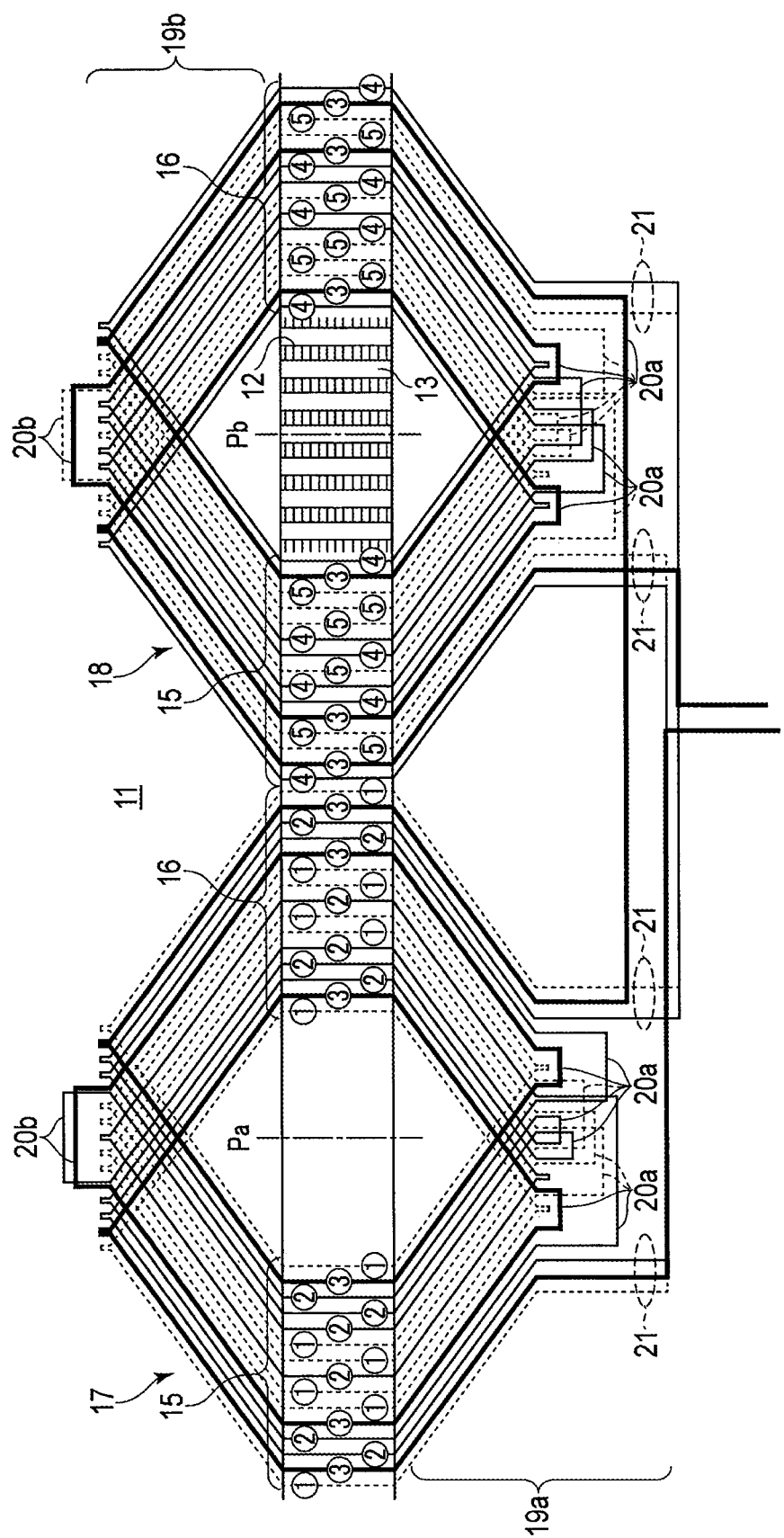
FIG. 5 is a developed perspective view illustrating a part of an armature winding of a rotating electrical machine for two poles/one phase according to a fifth embodiment.

FIG. 5 is a developed perspective view illustrating a part of an armature winding of a rotating electrical machine for two poles/one phase according to a fifth embodiment.

As illustrated in FIG. 5, nineteen jumper wires 20a per phase are provided in the connection side coil ends 19a of the phase belts 17 and 18, and four jumper wires 20b per phase are provided in the counter-connection side coil ends 19b. In addition, in the first phase belt 17, the circuits of the upper and lower coil pieces 15 and 16 are numbered "1, 3, 2, 2, 2, 1, 1, 2, 1, 1, 3, 2, 2, 3, 1" sequentially from the pole center. In the second phase belt 18, the circuits of upper and lower coil pieces 15 and 16 are numbered "4, 3, 5, 5, 5, 4, 4, 5, 4, 4, 3, 5, 5, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 13.

TABLE 13

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | | | 1 | 1 |
| | Lower coil piece | 1 | | | | | | 1 | 1 |
| Parallel circuits 2, 5 | Upper coil piece | | | 1 | 1 | 1 | | | 1 |
| | Lower coil piece | | | 1 | 1 | 1 | | | 1 |
| Parallel circuit 3 | Upper coil piece | | 1 | | | | | | |
| | Lower coil piece | | 1 | | | | | | |

| | | Relative positions from pole center | | | | | |
|---|---|---|---|---|---|---|---|
| | | 9 | 10 | 11 | 12 | 13 | 14 | 15 |
| Parallel circuits 1, 4 | Upper coil piece | 1 | 1 | | | | | 1 |
| | Lower coil piece | 1 | 1 | | | | | 1 |
| Parallel circuits 2, 5 | Upper coil piece | | | | 1 | 1 | | |
| | Lower coil piece | | | | 1 | 1 | | |
| Parallel circuit 3 | Upper coil piece | | | 1 | | | 1 | |
| | Lower coil piece | | | 1 | | | 1 | |

As shown in Table 13, for each of the first and fourth parallel circuits, six upper and lower coil pieces 15 and 16 are placed in the 1st, 6th, 7th, 9th, 10th, and 15th positions from the pole center. For each of the second and fifth parallel circuits, six upper and lower coil pieces 15 and 16 are placed in the 3rd, 4th, 5th, 8th, 12th, and 13th positions from the pole center. For the third parallel circuit, three upper and lower coil pieces 15 and 16 are placed in the 2nd, 11th, and 14th positions from the pole center.

Table 14 shows the degree of balance of the voltage generated from the armature winding according to the fifth embodiment. Meanwhile, according to the fifth embodiment, the degree of balance varies depending on a coil pitch. Therefore, in Table 14, the coil pitch is set to "37/45 (82.22%)." As shown in Table 14, in the armature winding according to the fifth embodiment, a voltage deviation (a deviation of a p.u. voltage from 1.0) is "0.19%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 14

| | Parallel circuit | | | | |
|---|---|---|---|---|---|
| | 1 | 2 | 3 | 4 | 5 |
| Voltage [p.u.] | 1.0019 | 0.9982 | 0.9998 | 1.0019 | 0.9982 |
| Voltage phase [°] | 0.0000 | 0.0000 | 0.0000 | 0.0000 | 0.0000 |

Table 15 shows a change in the maximum values of the voltage deviation and the phase angle deviation depending on a coil pitch according to the fifth embodiment. When the coil pitch is within a range of 36/45 to 38/45, the degree of balance satisfies the requirement of Habermann's patent, in which the voltage deviation be "0.4%" or smaller, and the phase angle deviation be "0.15°" or smaller.

TABLE 15

| | Coil pitch | | | | |
|---|---|---|---|---|---|
| | 35/45 | 36/45 | 37/45 | 38/45 | 39/45 |
| Voltage Deviation [%] | 0.5424 | 0.3183 | 0.1888 | 0.2895 | 0.5563 |
| Phase angle Deviation [°] | 0.0000 | 0.0000 | 0.0000 | 0.0000 | 0.0000 |

As described above, according to the fifth embodiment, it is possible to realize the degree of balance satisfying the requirement of Habermann's patent regarding the voltages of the parallel circuits and reduce a circulating current.

Note that the embodiment is not limited to the configuration described above. For example, the lead-out positions may be set differently from those described above, or the coil pieces located in electrically equivalent positions may be exchanged between the parallel circuits 1 and 4.

The sixth to sixteenth embodiments described below relate to an exemplary configuration of an armature winding in which the jumper wire 20a for connecting the coil pieces of the same parallel circuit within the same phase belt using the connection side coil end 19a is connected to the coil piece connected to the lead-out connection conductor 21 and several coil pieces excluding the coil piece located in the vicinity of the coil piece connected to the lead-out connection conductor 21. In this configuration, the connection-side jumper wire 20a and the lead-out connection conductor 21 do not easily interfere with each other. Therefore, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

Sixth Embodiment

First, a sixth embodiment will be described with reference to FIG. 6. Here, the parts common to those of the first embodiment described above (FIG. 1) will not be repeatedly described, and the description will focus on the different parts.

Figure 6:
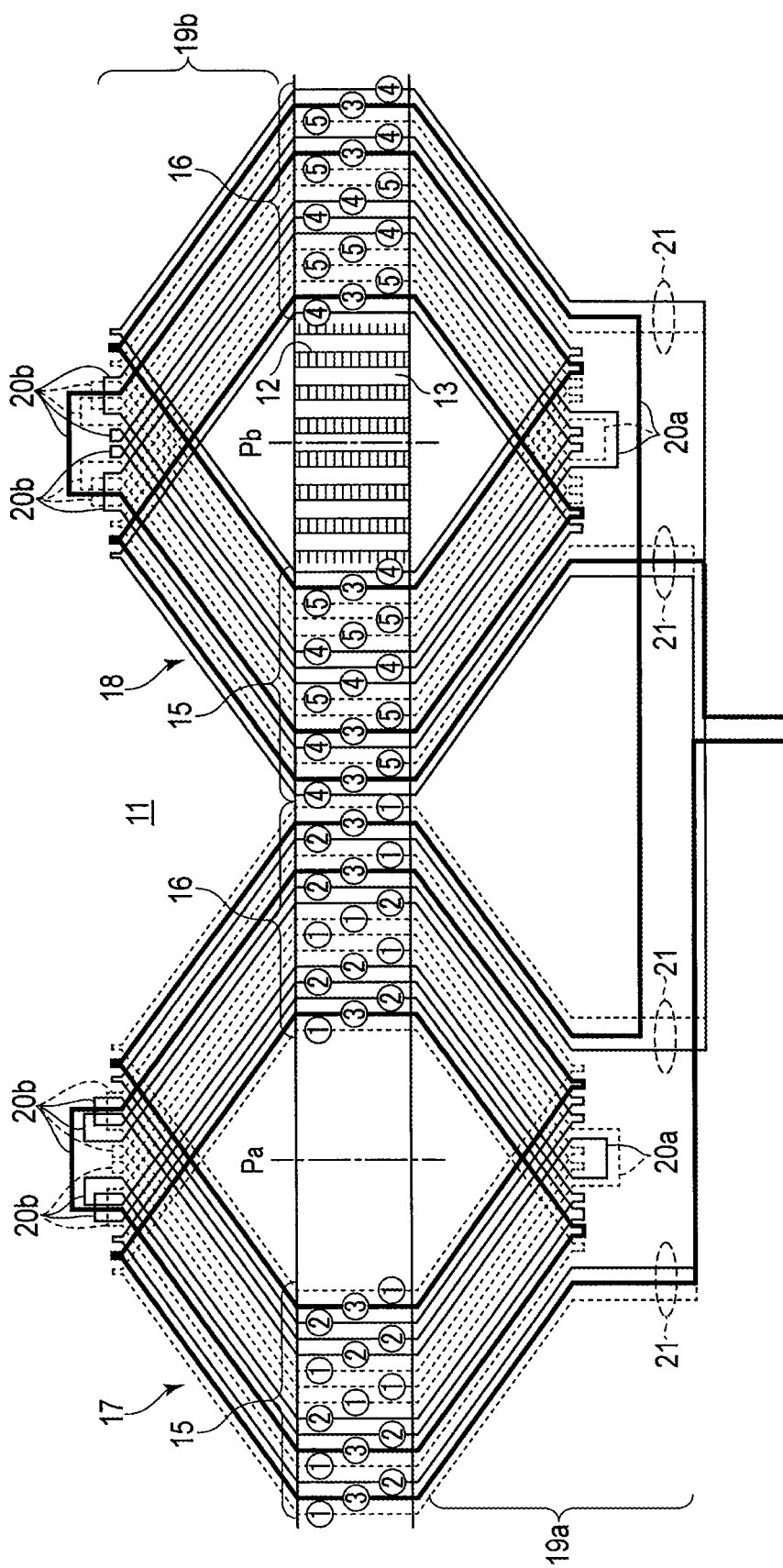
FIG. 6 is a developed perspective view illustrating a part of an armature winding of a rotating electrical machine for two poles/one phase according to a sixth embodiment.

FIG. 6 is a developed perspective view illustrating a part of an armature winding of a rotating electrical machine for two poles/one phase according to a sixth embodiment.

As illustrated in FIG. 6, five jumper wires 20a per phase are provided in the connection side coil ends 19a of the phase belts 17 and 18, and eighteen jumper wires 20b per phase are provided in the counter-connection side coil ends 19b. In addition, in the first phase belt 17, the circuits of the upper and lower coil pieces 15 and 16 are numbered "1, 3, 2, 2, 2, 1, 1, 1, 2, 2, 3, 1, 2, 3, 1" sequentially from the pole center. In the second phase belt 18, the circuits of upper and lower coil pieces 15 and 16 are numbered "4, 3, 5, 5, 5, 4, 4, 4, 5, 5, 3, 4, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 16.

TABLE 16

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | | 1 | 1 | 1 |
| | Lower coil piece | 1 | | | | | 1 | 1 | 1 |
| Parallel circuits 2, 5 | Upper coil piece | | | 1 | 1 | 1 | | | |
| | Lower coil piece | | | 1 | 1 | 1 | | | |
| Parallel circuit 3 | Upper coil piece | | 1 | | | | | | |
| | Lower coil piece | | 1 | | | | | | |

| | | Relative positions from pole center | | | | | |
|---|---|---|---|---|---|---|---|
| | | 9 | 10 | 11 | 12 | 13 | 14 | 15 |
| Parallel circuits 1, 4 | Upper coil piece | | | | 1 | | | 1 |
| | Lower coil piece | | | | 1 | | | 1 |
| Parallel circuits 2, 5 | Upper coil piece | 1 | 1 | | | 1 | | |
| | Lower coil piece | 1 | 1 | | | 1 | | |
| Parallel circuit 3 | Upper coil piece | | | 1 | | | 1 | |
| | Lower coil piece | | | 1 | | | 1 | |

As shown in Table 16, for each of the first and fourth parallel circuits, six upper and lower coil pieces 15 and 16 are placed in the 1st, 6th, 7th, 8th, 12th, and 15th positions from the pole center. For each of the second and fifth parallel circuits, six upper and lower coil pieces 15 and 16 are placed in the 3rd, 4th, 5th, 9th, 10th, and 13th positions from the pole center. For the third parallel circuit, three upper and lower coil pieces 15 and 16 are placed in the 2nd, 11th, and 14th positions from the pole center.

Table 17 shows the degree of balance of the voltage generated from the armature winding according to the sixth embodiment. Meanwhile, according to the sixth embodiment, the degree of balance varies depending on a coil pitch. Therefore, in Table 17, the coil pitch is set to "37/45 (82.22%)." As shown in Table 17, in the armature winding according to the sixth embodiment, a voltage deviation (a deviation of a p.u. voltage from 1.0) is "0.0589%" at most, and a phase angle deviation is "0.00°." It is recognized that these values satisfy the requirement of Habermann's patent, in which the voltage deviation be "0.4%" or smaller, and the phase angle deviation be "0.15° " or smaller.

TABLE 17

| | Parallel circuit | | | | |
|---|---|---|---|---|---|
| | 1 | 2 | 3 | 4 | 5 |
| Voltage [p.u.] | 1.0006 | 0.9995 | 0.9998 | 1.0006 | 0.9995 |
| Voltage phase [°] | 0.0000 | 0.0000 | 0.0000 | 0.0000 | 0.0000 |

Table 18 shows a change in the maximum values of the voltage deviation and the phase angle deviation depending on a coil pitch according to the sixth embodiment. When the coil pitch is within a range of 36/45 to 38/45, the voltage deviation satisfies the requirement of Habermann's patent, in which the voltage deviation be "0.4%" or smaller, and the phase angle deviation be "0.15° " or smaller.

TABLE 18

| | Coil pitch | | | | |
|---|---|---|---|---|---|
| | 35/45 | 36/45 | 37/45 | 38/45 | 39/45 |
| Voltage Deviation [%] | 0.5424 | 0.2590 | 0.0589 | 0.2895 | 0.5563 |
| Phase angle Deviation [°] | 0.0000 | 0.0000 | 0.0000 | 0.0000 | 0.0000 |

As illustrated in FIG. 6, the connection-side jumper wire 20*a* is not connected to the coil piece positioned in the vicinity of the coil piece connected to the lead-out connection conductor 21. Therefore, the connection-side jumper wire 20*a* and the lead-out connection conductor 21 do not easily interfere with each other. Accordingly, it is possible to more easily perform a work for connecting the connection-side jumper wire 20*a* or the lead-out connection conductor 21 and prevent a failure in the coil connection or an insulation failure. In addition, it is possible to provide a rotating electrical machine having higher reliability.

As described above, according to the sixth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Seventh Embodiment

Next, a seventh embodiment will be described with reference to FIG. 7. Here, the parts common to those of the first embodiment described above (FIG. 1) will not be repeatedly described, and the description will focus on the different parts.

Figure 7:
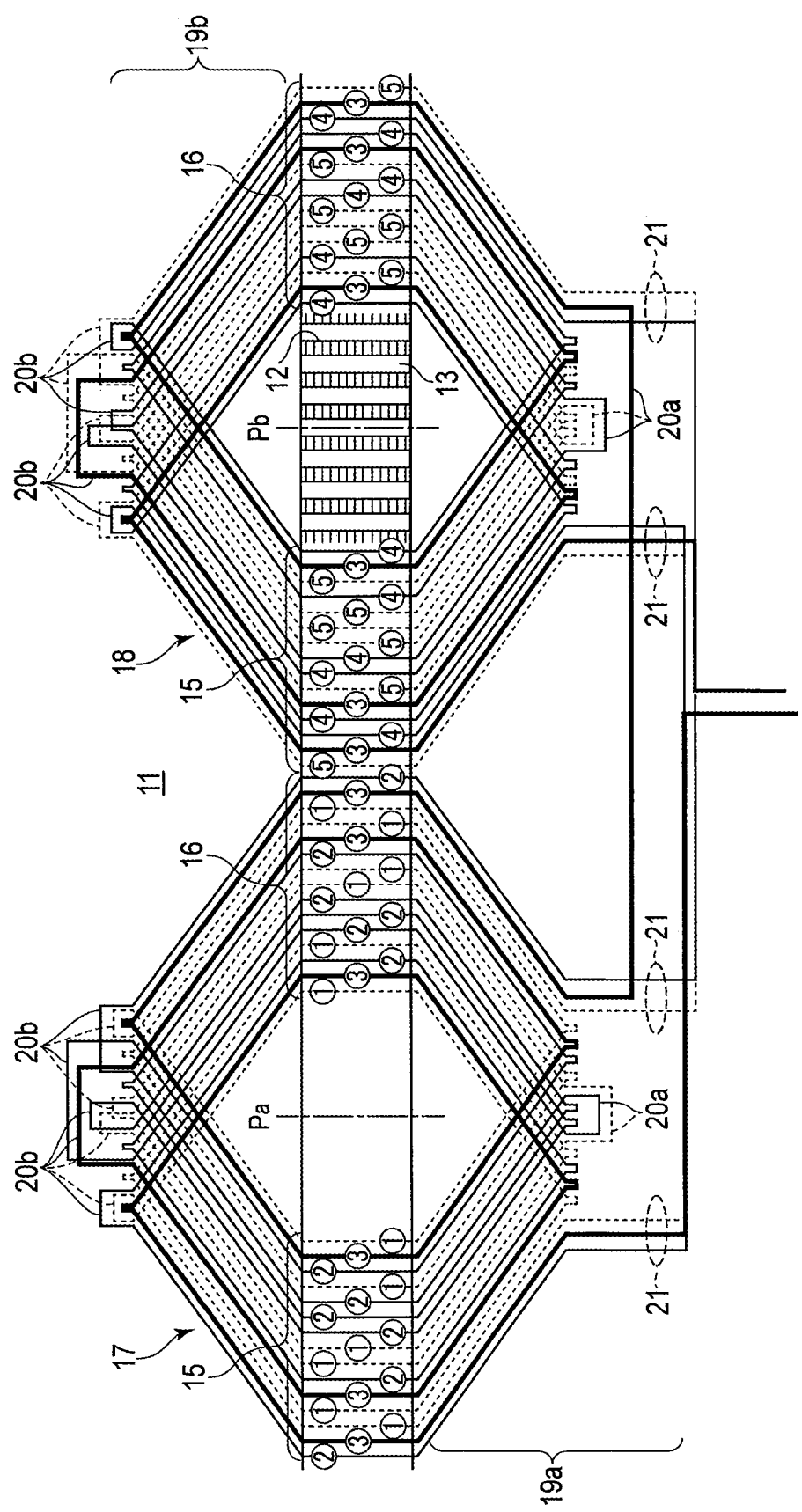
FIG. 7 is a developed perspective view illustrating a part of an armature winding of a rotating electrical machine for two poles/one phase according to a seventh embodiment.

FIG. 7 is a developed perspective view illustrating a part of an armature winding of a rotating electrical machine for two poles/one phase according to a seventh embodiment.

As illustrated in FIG. 7, five jumper wires 20*a* per phase are provided in the connection side coil ends 19*a* of the phase belts 17 and 18, and eighteen jumper wires 20*b* per phase are provided in the counter-connection side coil ends 19*b*. In addition, in the first phase belt 17, the circuits of the upper and lower coil pieces 15 and 16 are numbered "1, 3, 2, 1, 2, 2, 2, 1, 1, 2, 3, 1, 1, 3, 2" sequentially from the pole center. In the second phase belt 18, the circuits of upper and lower coil pieces 15 and 16 are numbered "4, 3, 5, 4, 5, 5, 5, 4, 4, 5, 3, 4, 4, 3, 5" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 19.

TABLE 19

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | 1 | | | | | 1 |
| | Lower coil piece | 1 | | 1 | | | | | 1 |
| Parallel circuits 2, 5 | Upper coil piece | | 1 | | 1 | 1 | 1 | | |
| | Lower coil piece | | 1 | | 1 | 1 | 1 | | |
| Parallel | Upper coil piece | | 1 | | | | | | |

TABLE 19-continued

| circuit 3 | Lower coil piece | 1 |

| | | Relative positions from pole center | | | | | |
|---|---|---|---|---|---|---|---|
| | | 9 | 10 | 11 | 12 | 13 | 14 | 15 |
| Parallel circuits 1, 4 | Upper coil piece | 1 | | | 1 | 1 | | |
| | Lower coil piece | 1 | | | 1 | 1 | | |
| Parallel circuits 2, 5 | Upper coil piece | | 1 | | | | | 1 |
| | Lower coil piece | | 1 | | | | | 1 |
| Parallel circuit 3 | Upper coil piece | | | 1 | | 1 | | |
| | Lower coil piece | | | 1 | | 1 | | |

As shown in Table 19, for each of the first and fourth parallel circuits, six upper and lower coil pieces 15 and 16 are placed in the 1st, 4th, 8th, 9th, 12th, and 13th positions from the pole center. For each of the second and fifth parallel circuits, six upper and lower coil pieces 15 and 16 are placed in the 3rd, 5th, 6th, 7th, 10th, and 15th positions from the pole center. For the third parallel circuit, three upper and lower coil pieces 15 and 16 are placed in the 2nd, 11th, and 14th positions from the pole center.

Table 20 shows the degree of balance of the voltage generated from the armature winding according to the seventh embodiment. Meanwhile, according to the seventh embodiment, the degree of balance varies depending on a coil pitch. Therefore, in Table 20, the coil pitch is set to "37/45 (82.22%)." As shown in Table 20, in the armature winding according to the seventh embodiment, a voltage deviation (a deviation of a p.u. voltage from 1.0) is "0.0885%" at most, and a phase angle deviation is "0.00°." It is recognized that these values satisfy the requirement of Habermann's patent.

TABLE 20

| | Parallel circuit | | | | |
|---|---|---|---|---|---|
| | 1 | 2 | 3 | 4 | 5 |
| Voltage [p.u.] | 0.9992 | 1.0009 | 0.9998 | 0.9992 | 1.0009 |
| Voltage phase [°] | 0.0000 | 0.0000 | 0.0000 | 0.0000 | 0.0000 |

Table 21 shows a change in the maximum values of the voltage deviation and the phase angle deviation depending on a coil pitch according to the seventh embodiment. When the coil pitch is within a range of 36/45 to 38/45, the voltage deviation satisfies the requirement of Habermann's patent, in which the voltage deviation be "0.4%" or smaller, and the phase angle deviation be "0.15°" or smaller.

TABLE 21

| | Coil pitch | | | | |
|---|---|---|---|---|---|
| | 35/45 | 36/45 | 37/45 | 38/45 | 39/45 |
| Voltage Deviation [%] | 0.5424 | 0.2590 | 0.0885 | 0.2895 | 0.5563 |
| Phase angle Deviation [°] | 0.0000 | 0.0000 | 0.0000 | 0.0000 | 0.0000 |

As illustrated in FIG. 7, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the seventh embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Eighth Embodiment

Next, an eighth embodiment will be described with reference to FIG. 8. Here, the parts common to those of the first embodiment described above (FIG. 1) will not be repeatedly described, and the description will focus on the different parts.

Figure 8:
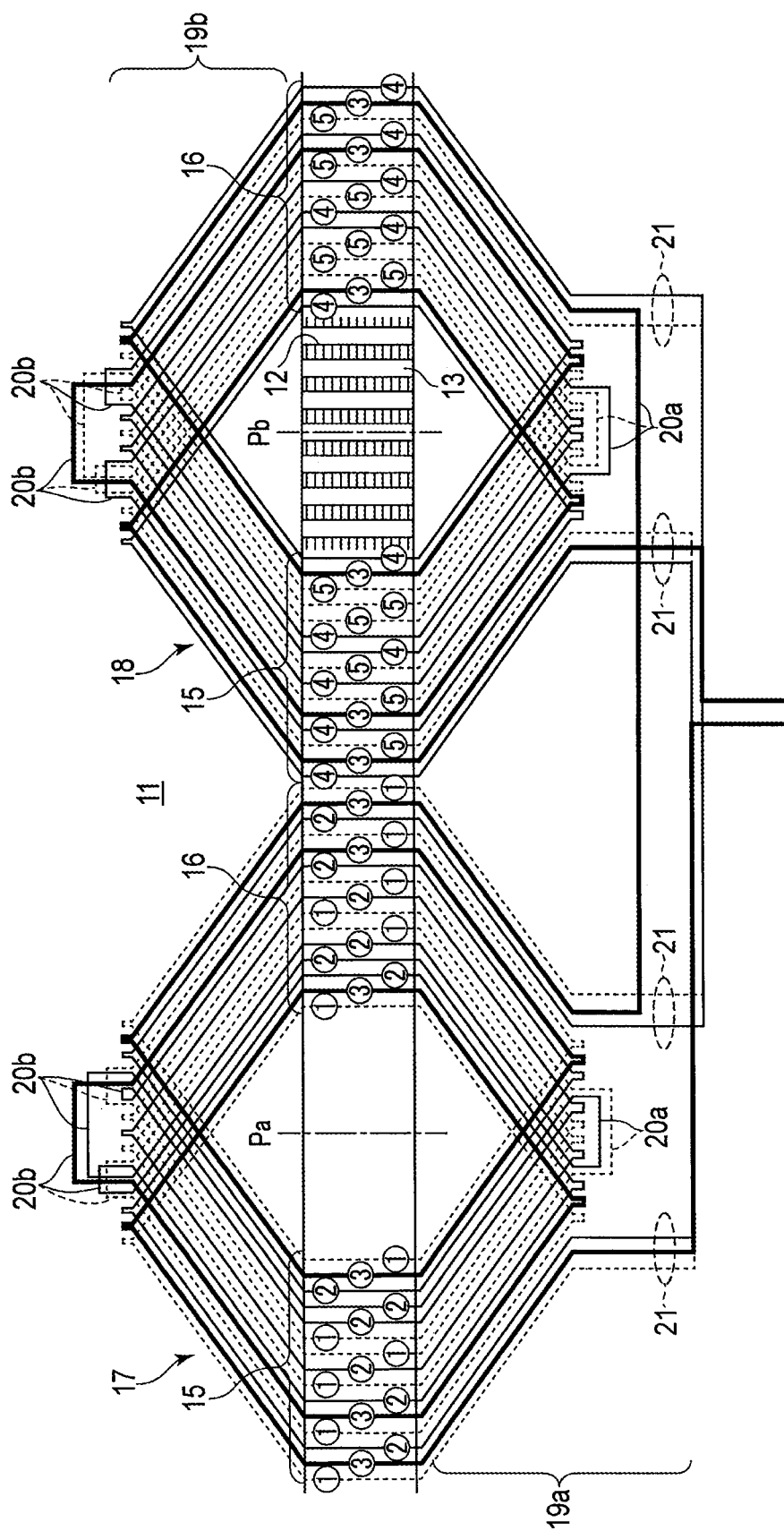
FIG. 8 is a developed perspective view illustrating a part of an armature winding of a rotating electrical machine for two poles/one phase according to an eighth embodiment.

FIG. 8 is a developed perspective view illustrating a part of an armature winding of a rotating electrical machine for two poles/one phase according to an eighth embodiment.

As illustrated in FIG. 8, five jumper wires 20a per phase are provided in the connection side coil ends 19a of the phase belts 17 and 18, and twelve jumper wires 20b per phase are provided in the counter-connection side coil ends 19b. In addition, in the first phase belt 17, the circuits of the upper and lower coil pieces 15 and 16 are numbered "1, 3, 2, 2, 2, 1, 1, 2, 1, 2, 3, 1, 2, 3, 1" sequentially from the pole center. In the second phase belt 18, the circuits of upper and lower coil pieces 15 and 16 are numbered "4, 3, 5, 5, 5, 4, 4, 5, 4, 5, 3, 4, 5, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 22.

TABLE 22

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | | 1 | 1 | |
| | Lower coil piece | 1 | | | | | 1 | 1 | |
| Parallel circuits 2, 5 | Upper coil piece | | | 1 | 1 | 1 | | | 1 |
| | Lower coil piece | | | 1 | 1 | 1 | | | 1 |
| Parallel circuit 3 | Upper coil piece | | 1 | | | | | | |
| | Lower coil piece | | 1 | | | | | | |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | | | 1 | | | 1 |
| | Lower coil piece | 1 | | | 1 | | | 1 |
| Parallel circuits 2, 5 | Upper coil piece | | 1 | | | 1 | | |
| | Lower coil piece | | 1 | | | 1 | | |
| Parallel circuit 3 | Upper coil piece | | | 1 | | | 1 | |
| | Lower coil piece | | | 1 | | | 1 | |

As shown in Table 22, for each of the first and fourth parallel circuits, six upper and lower coil pieces 15 and 16 are placed in the 1st, 6th, 7th, 9th, 12th, and 15th positions from the pole center. For each of the second and fifth parallel circuits, six upper and lower coil pieces 15 and 16 are placed in the 3rd, 4th, 5th, 8th, 10th, and 13th positions from the pole center. For the third parallel circuit, three upper and lower coil pieces 15 and 16 are placed in the 2nd, 11th, and 14th positions from the pole center.

Table 23 shows the degree of balance of the voltage generated from the armature winding according to the eighth embodiment. Meanwhile, according to the eighth embodiment, the degree of balance varies depending on a coil pitch. Therefore, in Table 23, the coil pitch is set to "37/45 (82.22%)." As shown in Table 23, in the armature winding according to the eighth embodiment, a voltage deviation (a deviation of a p.u. voltage from 1.0) is "0.3654%" at most, and a phase angle deviation is "0.00°." It is recognized that these values satisfy the requirement of Habermann's patent, in which the voltage deviation be "0.4%" or smaller, and the phase angle deviation be "0.15° " or smaller.

TABLE 23

|  | Parallel circuit | | | | |
| --- | --- | --- | --- | --- | --- |
|  | 1 | 2 | 3 | 4 | 5 |
| Voltage [p.u.] | 1.0037 | 0.9964 | 0.9998 | 1.0037 | 0.9964 |
| Voltage phase [°] | 0.0000 | 0.0000 | 0.0000 | 0.0000 | 0.0000 |

Table 24 shows a change in the maximum values of the voltage deviation and the phase angle deviation depending on a coil pitch according to the eighth embodiment. When the coil pitch is within a range of 37/45 to 38/45, the voltage deviation satisfies the requirement of Habermann's patent, in which the voltage deviation be "0.4%" or smaller, and the phase angle deviation be "0.15° " or smaller.

TABLE 24

|  | Coil pitch | | | |
| --- | --- | --- | --- | --- |
|  | 36/45 | 37/45 | 38/45 | 39/45 |
| Voltage Deviation [%] | 0.5859 | 0.3654 | 0.2895 | 0.5563 |
| Phase angle Deviation [°] | 0.0000 | 0.0000 | 0.0000 | 0.0000 |

As illustrated in FIG. 8, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the eighth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Ninth Embodiment

Next, a ninth embodiment will be described with reference to FIG. 9. Here, the parts common to those of the first embodiment described above (FIG. 1) will not be repeatedly described, and the description will focus on the different parts.

Figure 9:
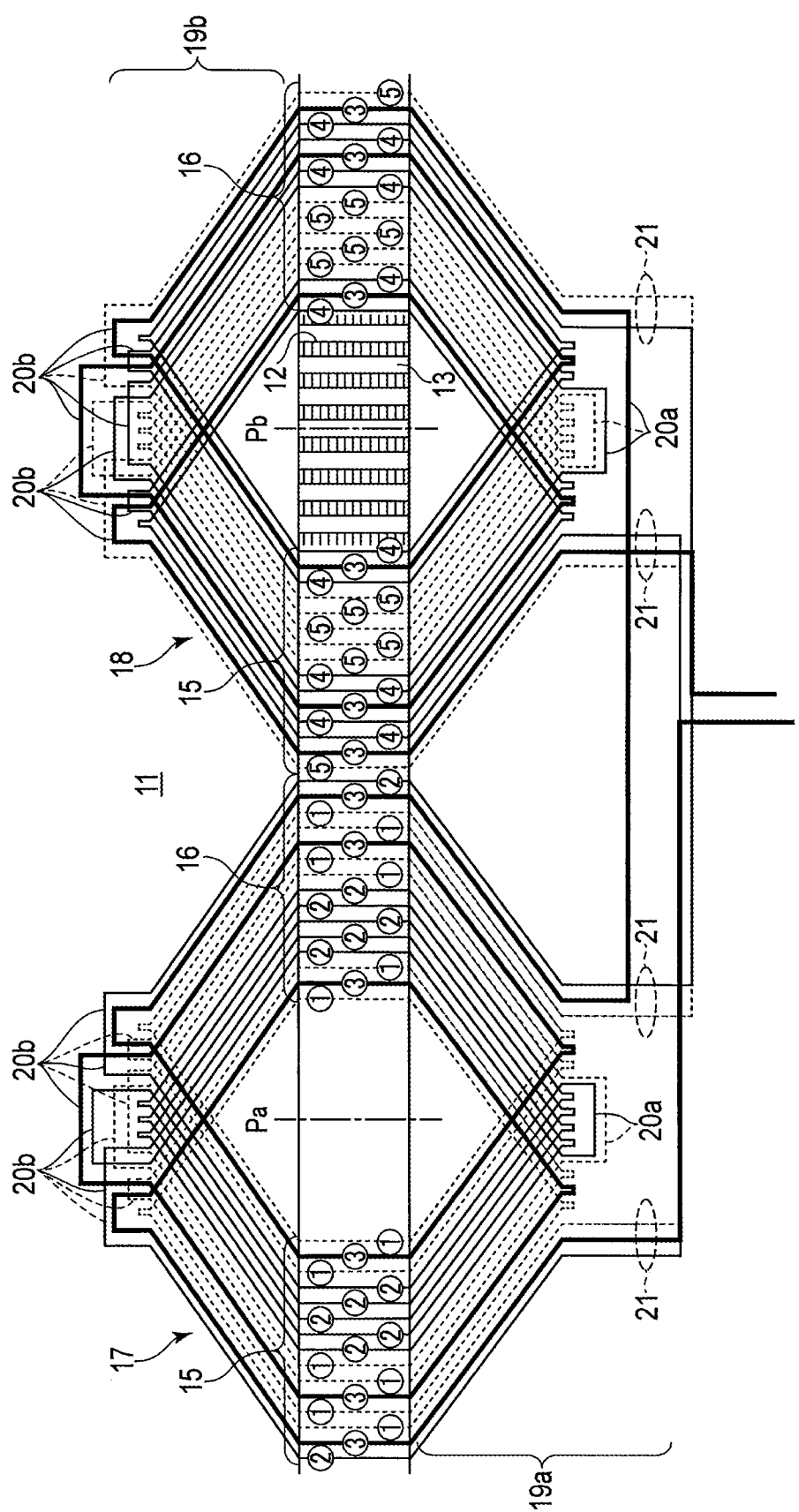
FIG. 9 is a developed perspective view illustrating a part of an armature winding of a rotating electrical machine for two poles/one phase according to an ninth embodiment.

FIG. 9 is a developed perspective view illustrating a part of an armature winding of a rotating electrical machine for two poles/one phase according to a ninth embodiment.

As illustrated in FIG. 9, five jumper wires 20a per phase are provided in the connection side coil ends 19a of the phase belts 17 and 18, and twenty jumper wires 20b per phase are provided in the counter-connection side coil ends 19b. In addition, in the first phase belt 17, the circuits of the upper and lower coil pieces 15 and 16 are numbered "1, 3, 1, 2, 2, 2, 2, 2, 1, 1, 3, 1, 1, 3, 2" sequentially from the pole center. In the second phase belt 18, the circuits of upper and lower coil pieces 15 and 16 are numbered "4, 3, 4, 5, 5, 5, 5, 5, 4, 4, 3, 4, 4, 3, 5" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 25.

TABLE 25

|  |  | Relative positions from pole center | | | | | | | |
| --- | --- | --- | --- | --- | --- | --- | --- | --- | --- |
|  |  | 1 | 2 | 3 | 4 | 5 | 6 | 7 | 8 |
| Parallel circuits 1, 4 | Upper coil piece | 1 |  | 1 |  |  |  |  |  |
|  | Lower coil piece | 1 |  | 1 |  |  |  |  |  |
| Parallel circuits 2, 5 | Upper coil piece |  |  |  | 1 | 1 | 1 | 1 | 1 |
|  | Lower coil piece |  |  |  | 1 | 1 | 1 | 1 | 1 |
| Parallel circuit 3 | Upper coil piece |  | 1 |  |  |  |  |  |  |
|  | Lower coil piece |  | 1 |  |  |  |  |  |  |

|  |  | Relative positions from pole center | | | | | | |
| --- | --- | --- | --- | --- | --- | --- | --- | --- |
|  |  | 9 | 10 | 11 | 12 | 13 | 14 | 15 |
| Parallel circuits 1, 4 | Upper coil piece | 1 | 1 |  | 1 | 1 |  |  |
|  | Lower coil piece | 1 | 1 |  | 1 | 1 |  |  |
| Parallel circuits 2, 5 | Upper coil piece |  |  |  |  |  |  | 1 |
|  | Lower coil piece |  |  |  |  |  |  | 1 |
| Parallel circuit 3 | Upper coil piece |  |  | 1 |  |  | 1 |  |
|  | Lower coil piece |  |  | 1 |  |  | 1 |  |

As shown in Table 25, for each of the first and fourth parallel circuits, six upper and lower coil pieces 15 and 16 are placed in the 1st, 3rd, 9th, 10th, 12th, and 13th positions from the pole center. For each of the second and fifth parallel circuits, six upper and lower coil pieces 15 and 16 are placed in the 4th, 5th, 6th, 7th, 8th, and 15th positions from the pole center. For the third parallel circuit, three upper and lower coil pieces 15 and 16 are placed in the 2nd, 11th, and 14th positions from the pole center.

Table 26 shows the degree of balance of the voltage generated from the armature winding according to the ninth embodiment. Meanwhile, according to the ninth embodiment, the degree of balance varies depending on a coil pitch. Therefore, in Table 26, the coil pitch is set to "37/45 (82.22%)." As shown in Table 26, in the armature winding according to the ninth embodiment, a voltage deviation (a deviation of a p.u. voltage from 1.0) is "0.2705%" at most, and a phase angle deviation is "0.00°." It is recognized that these values satisfy the requirement of Habermann's patent, in which the voltage deviation be "0.4%" or smaller, and the phase angle deviation be "0.15° " or smaller.

TABLE 26

| | Parallel circuit | | | | |
|---|---|---|---|---|---|
| | 1 | 2 | 3 | 4 | 5 |
| Voltage [p.u.] | 0.9974 | 1.0027 | 0.9998 | 0.9974 | 1.0027 |
| Voltage phase [°] | 0.0000 | 0.0000 | 0.0000 | 0.0000 | 0.0000 |

Table 27 shows a change in the maximum values of the voltage deviation and the phase angle deviation depending on a coil pitch according to the ninth embodiment. When the coil pitch is within a range of 36/45 to 37/45, the voltage deviation satisfies the requirement of Habermann's patent, in which the voltage deviation be "0.4%" or smaller, and the phase angle deviation be "0.15° " or smaller.

TABLE 27

| | Coil pitch | | | |
|---|---|---|---|---|
| | 35/45 | 36/45 | 37/45 | 38/45 |
| Voltage Deviation [%] | 0.5424 | 0.2590 | 0.2705 | 0.4161 |
| Phase angle Deviation [°] | 0.0000 | 0.0000 | 0.0000 | 0.0000 |

As illustrated in FIG. 9, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the ninth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Tenth Embodiment

Next, a tenth embodiment will be described with reference to FIG. 10. Here, the parts common to those of the first embodiment described above (FIG. 1) will not be repeatedly described, and the description will focus on the different parts.

Figure 10:
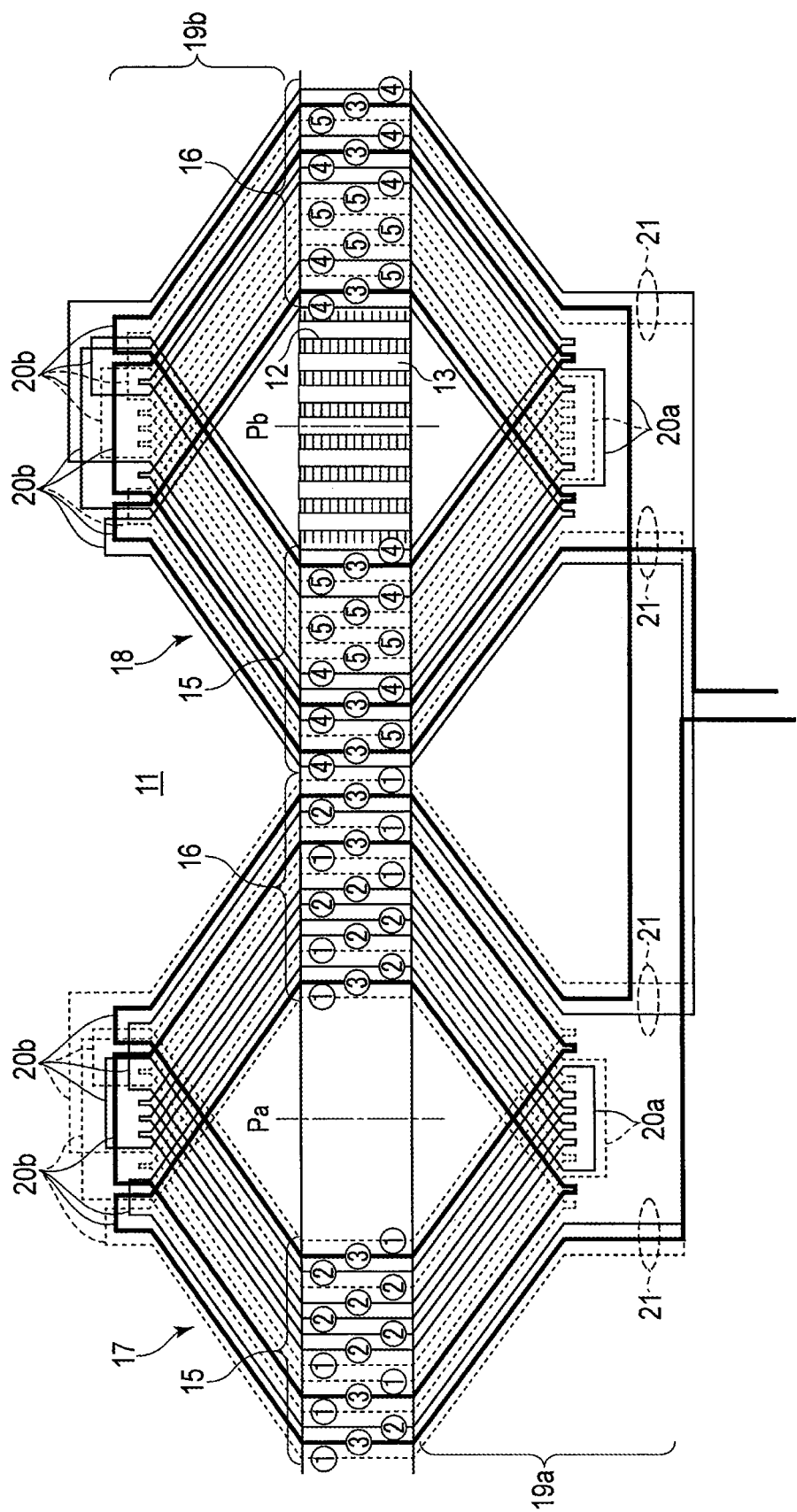
FIG. 10 is a developed perspective view illustrating a part of an armature winding of a rotating electrical machine for two poles/one phase according to an tenth embodiment.

FIG. 10 is a developed perspective view illustrating a part of an armature winding of a rotating electrical machine for two poles/one phase according to a tenth embodiment.

As illustrated in FIG. 10, five jumper wires 20a per phase are provided in the connection side coil ends 19a of the phase belts 17 and 18, and twenty jumper wires 20b per phase are provided in the counter-connection side coil ends 19b. In addition, in the first phase belt 17, the circuits of the upper and lower coil pieces 15 and 16 are numbered "1, 3, 2, 1, 2, 2, 2, 2, 1, 1, 3, 1, 2, 3, 1" sequentially from the pole center. In the second phase belt 18, the circuits of upper and lower coil pieces 15 and 16 are numbered "4, 3, 5, 4, 5, 5, 5, 5, 4, 4, 3, 4, 5, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 28.

TABLE 28

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | 1 | | | | |
| | Lower coil piece | 1 | | | 1 | | | | |
| Parallel circuits 2, 5 | Upper coil piece | | | 1 | | 1 | 1 | 1 | 1 |
| | Lower coil piece | | | 1 | | 1 | 1 | 1 | 1 |
| Parallel circuit 3 | Upper coil piece | | 1 | | | | | | |
| | Lower coil piece | | 1 | | | | | | |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | 1 | | 1 | | | 1 |
| | Lower coil piece | 1 | 1 | | 1 | | | 1 |
| Parallel circuits 2, 5 | Upper coil piece | | | | | 1 | | |
| | Lower coil piece | | | | | 1 | | |
| Parallel circuit 3 | Upper coil piece | | | 1 | | | 1 | |
| | Lower coil piece | | | 1 | | | 1 | |

As shown in Table 28, for each of the first and fourth parallel circuits, six upper and lower coil pieces 15 and 16 are placed in the 1st, 4th, 9th, 10th, 12th, and 15th positions from the pole center. For each of the second and fifth parallel circuits, six upper and lower coil pieces 15 and 16 are placed in the 3rd, 5th, 6th, 7th, 8th, and 13th positions from the pole center. For the third parallel circuit, three upper and lower coil pieces 15 and 16 are placed in the 2nd, 11th, and 14th positions from the pole center.

Table 29 shows the degree of balance of the voltage generated from the armature winding according to the tenth embodiment. Meanwhile, according to the tenth embodiment, the degree of balance varies depending on a coil pitch. Therefore, in Table 29, the coil pitch is set to "37/45 (82.22%)." As shown in Table 29, in the armature winding according to the tenth embodiment, a voltage deviation (a deviation of a p.u. voltage from 1.0) is "0.0946%" at most, and a phase angle deviation is "0.00°." It is recognized that these values satisfy the requirement of Habermann's patent, in which the voltage deviation be "0.4%" or smaller, and the phase angle deviation be "0.15° " or smaller.

TABLE 29

| | Parallel circuit | | | | |
|---|---|---|---|---|---|
| | 1 | 2 | 3 | 4 | 5 |
| Voltage [p.u.] | 1.0009 | 0.9991 | 0.9998 | 1.0009 | 0.9991 |
| Voltage phase [°] | 0.0000 | 0.0000 | 0.0000 | 0.0000 | 0.0000 |

Table 30 shows a change in the maximum values of the voltage deviation and the phase angle deviation depending on a coil pitch according to the tenth embodiment. When the coil pitch is within a range of 36/45 to 38/45, the voltage deviation satisfies the requirement of Habermann's patent, in which the voltage deviation be "0.4%" or smaller, and the phase angle deviation be "0.15° " or smaller.

TABLE 30

| | Coil pitch | | | | |
|---|---|---|---|---|---|
| | 35/45 | 36/45 | 37/45 | 38/45 | 39/45 |
| Voltage Deviation [%] | 0.6473 | 0.3632 | 0.0946 | 0.2895 | 0.5563 |
| Phase angle Deviation [°] | 0.0000 | 0.0000 | 0.0000 | 0.0000 | 0.0000 |

As illustrated in FIG. 10, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the tenth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Eleventh Embodiment

Next, an eleventh embodiment will be described with reference to FIG. 11. Here, the parts common to those of the first embodiment described above (FIG. 1) will not be repeatedly described, and the description will focus on the different parts.

Figure 11:
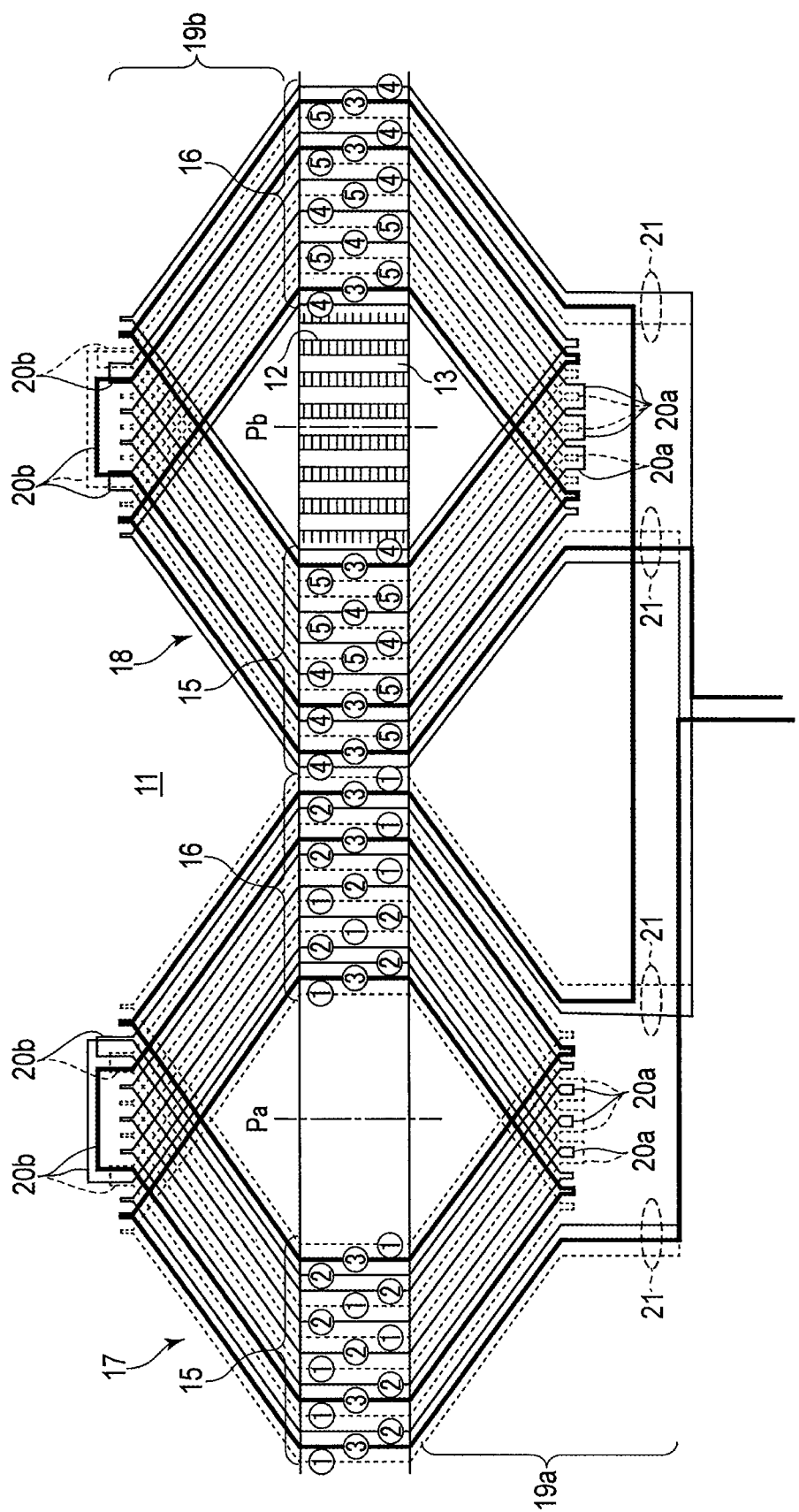
FIG. 11 is a developed perspective view illustrating a part of an armature winding of a rotating electrical machine for two poles/one phase according to an eleventh embodiment.

FIG. 11 is a developed perspective view illustrating a part of an armature winding of a rotating electrical machine for two poles/one phase according to an eleventh embodiment.

As illustrated in FIG. 11, thirteen jumper wires 20a per phase are provided in the connection side coil ends 19a of the phase belts 17 and 18, and ten jumper wires 20b per phase are provided in the counter-connection side coil ends 19b. In addition, in the first phase belt 17, the circuits of the upper and lower coil pieces 15 and 16 are numbered "1, 3, 2, 2, 1, 2, 1, 2, 1, 2, 3, 1, 2, 3, 1" sequentially from the pole center. In the second phase belt 18, the circuits of upper and lower coil pieces 15 and 16 are numbered "4, 3, 5, 5, 4, 5, 4, 5, 4, 5, 3, 4, 5, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 31.

TABLE 31

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | 1 | | | | 1 | | 1 | |
| | Lower coil piece | 1 | | | | 1 | 1 | | |
| Parallel circuits 2, 5 | Upper coil piece | | | 1 | 1 | | | 1 | 1 |
| | Lower coil piece | | | 1 | 1 | | | 1 | 1 |
| Parallel circuit 3 | Upper coil piece | | 1 | | | | | | |
| | Lower coil piece | | 1 | | | | | | |

TABLE 31-continued

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | | | 1 | | | 1 |
| | Lower coil piece | 1 | | | 1 | | | 1 |
| Parallel circuits 2, 5 | Upper coil piece | | | 1 | | 1 | | |
| | Lower coil piece | | | 1 | | 1 | | |
| Parallel circuit 3 | Upper coil piece | | | | 1 | | 1 | |
| | Lower coil piece | | | | 1 | | 1 | |

As shown in Table 31, for each of the first and fourth parallel circuits, six upper and lower coil pieces 15 and 16 are placed in the 1st, 5th, 7th, 9th, 12th, and 15th positions from the pole center. For each of the second and fifth parallel circuits, six upper and lower coil pieces 15 and 16 are placed in the 3rd, 4th, 6th, 8th, 10th, and 13th positions from the pole center. For the third parallel circuit, three upper and lower coil pieces 15 and 16 are placed in the 2nd, 11th, and 14th positions from the pole center.

Table 32 shows the degree of balance of the voltage generated from the armature winding according to the eleventh embodiment. Meanwhile, according to the eleventh embodiment, the degree of balance varies depending on a coil pitch. Therefore, in Table 32, the coil pitch is set to "37/45 (82.22%)." As shown in Table 32, in the armature winding according to the eleventh embodiment, a voltage deviation (a deviation of a p.u. voltage from 1.0) is "0.1990%" at most, and a phase angle deviation is "0.00°." It is recognized that these values satisfy the requirement of Habermann's patent, in which the voltage deviation be "0.4%" or smaller, and the phase angle deviation be "0.15" or smaller.

TABLE 32

| | Parallel circuit | | | | |
|---|---|---|---|---|---|
| | 1 | 2 | 3 | 4 | 5 |
| Voltage [p.u.] | 0.9981 | 1.0020 | 0.9998 | 0.9981 | 1.0020 |
| Voltage phase [°] | 0.0000 | 0.0000 | 0.0000 | 0.0000 | 0.0000 |

Table 33 shows a change in the maximum values of the voltage deviation and the phase angle deviation depending on a coil pitch according to the eleventh embodiment. When the coil pitch is within a range of 36/45 to 38/45, the voltage deviation satisfies the requirement of Habermann's patent, in which the voltage deviation be "0.4%" or smaller, and the phase angle deviation be "0.15°" or smaller.

TABLE 33

| | Coil pitch | | | | |
|---|---|---|---|---|---|
| | 35/45 | 36/45 | 37/45 | 38/45 | 39/45 |
| Voltage Deviation [%] | 0.5424 | 0.2590 | 0.1990 | 0.3790 | 0.5558 |
| Phase angle Deviation [°] | 0.0000 | 0.0000 | 0.0000 | 0.0000 | 0.0000 |

As illustrated in FIG. 11, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the eleventh embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Twelfth Embodiment

Next, a twelfth embodiment will be described with reference to FIG. 12. Here, the parts common to those of the first embodiment described above (FIG. 1) will not be repeatedly described, and the description will focus on the different parts.

Figure 12:
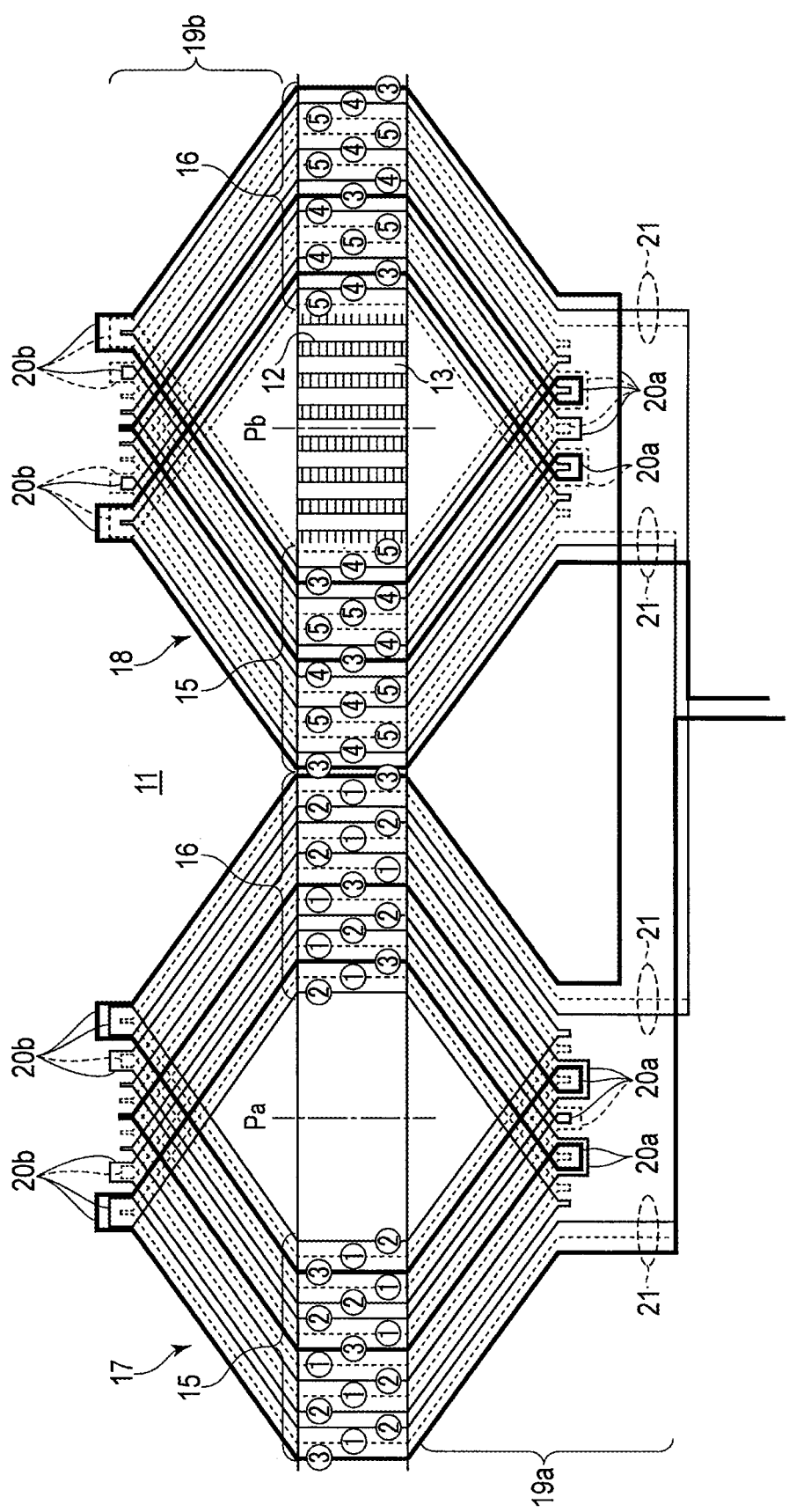
FIG. 12 is a developed perspective view illustrating a part of an armature winding of a rotating electrical machine for two poles/one phase according to a twelfth embodiment.

FIG. 12 is a developed perspective view illustrating a part of an armature winding of a rotating electrical machine for two poles/one phase according to a twelfth embodiment.

As illustrated in FIG. 12, thirteen jumper wires 20a per phase are provided in the connection side coil ends 19a of the phase belts 17 and 18, and sixteen jumper wires 20b per phase are provided in the counter-connection side coil ends 19b. In addition, in the first phase belt 17, the circuits of the upper and lower coil pieces 15 and 16 are numbered "2, 1, 3, 1, 2, 2, 1, 3, 1, 2, 1, 2, 2, 1, 3" sequentially from the pole center. In the second phase belt 18, the circuits of upper and lower coil pieces 15 and 16 are numbered "5, 4, 3, 4, 5, 5, 4, 3, 4, 5, 4, 5, 5, 4, 3" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 34.

TABLE 34

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | | 1 | | 1 | | | 1 | |
| | Lower coil piece | | 1 | | 1 | | | 1 | |
| Parallel circuits 2, 5 | Upper coil piece | 1 | | | | 1 | 1 | | |
| | Lower coil piece | 1 | | | | 1 | 1 | | |
| Parallel circuit 3 | Upper coil piece | | | 1 | | | | | 1 |
| | Lower coil piece | | | 1 | | | | | 1 |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | | 1 | | | 1 | |
| | Lower coil piece | 1 | | 1 | | | 1 | |
| Parallel circuits 2, 5 | Upper coil piece | | | | 1 | 1 | | |
| | Lower coil piece | | | | 1 | 1 | | |
| Parallel circuit 3 | Upper coil piece | | | | | | | 1 |
| | Lower coil piece | | | | | | | 1 |

As shown in Table 34, for each of the first and fourth parallel circuits, six upper and lower coil pieces 15 and 16 are placed in the 2nd, 4th, 7th, 9th, 11th, and 14th positions from the pole center. For each of the second and fifth parallel circuits, six upper and lower coil pieces 15 and 16 are placed in the 1st, 5th, 6th, 10th, 12th, and 13th positions from the pole center. For the third parallel circuit, three upper and lower coil pieces 15 and 16 are placed in the 3rd, 8th, and 15th positions from the pole center.

Table 35 shows the degree of balance of the voltage generated from the armature winding according to the twelfth embodiment. Meanwhile, according to the twelfth embodiment, the degree of balance varies depending on a coil pitch. Therefore, in Table 35, the coil pitch is set to "37/45 (82.22%)." As shown in Table 35, in the armature winding according to the twelfth embodiment, a voltage deviation (a deviation of a p.u. voltage from 1.0) is "0.2158%" at most, and a phase angle deviation is "0.00°." It is recognized that these values satisfy the requirement of Habermann's patent, in which the voltage deviation be "0.4%" or smaller, and the phase angle deviation be "0.15" or smaller.

TABLE 35

| | Parallel circuit | | | | |
|---|---|---|---|---|---|
| | 1 | 2 | 3 | 4 | 5 |
| Voltage [p.u.] | 1.0020 | 0.9991 | 0.9978 | 1.0020 | 0.9991 |
| Voltage phase [°] | 0.0000 | 0.0000 | 0.0000 | 0.0000 | 0.0000 |

Table 36 shows a change in the maximum values of the voltage deviation and the phase angle deviation depending on a coil pitch according to the twelfth embodiment. When the coil pitch is within a range of 34/45 to 38/45, the voltage deviation satisfies the requirement of Habermann's patent, in which the voltage deviation be "0.4%" or smaller, and the phase angle deviation be "0.15° " or smaller.

TABLE 36

| | Coil pitch | | | |
|---|---|---|---|---|
| | 33/45 | 34/45 | 35/45 | 36/45 |
| Voltage Deviation [%] | 0.4891 | 0.3058 | 0.1727 | 0.1550 |
| Phase angle Deviation [°] | 0.0000 | 0.0000 | 0.0000 | 0.0000 |

| | Coil pitch | | |
|---|---|---|---|
| | 37/45 | 38/45 | 39/45 |
| Voltage Deviation [%] | 0.2158 | 0.3823 | 0.5458 |
| Phase angle Deviation [°] | 0.0000 | 0.0000 | 0.0000 |

As illustrated in FIG. 12, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the twelfth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Thirteenth Embodiment

Next, a thirteenth embodiment will be described with reference to FIG. 13. Here, the parts common to those of the first embodiment described above (FIG. 1) will not be repeatedly described, and the description will focus on the different parts.

Figure 13:
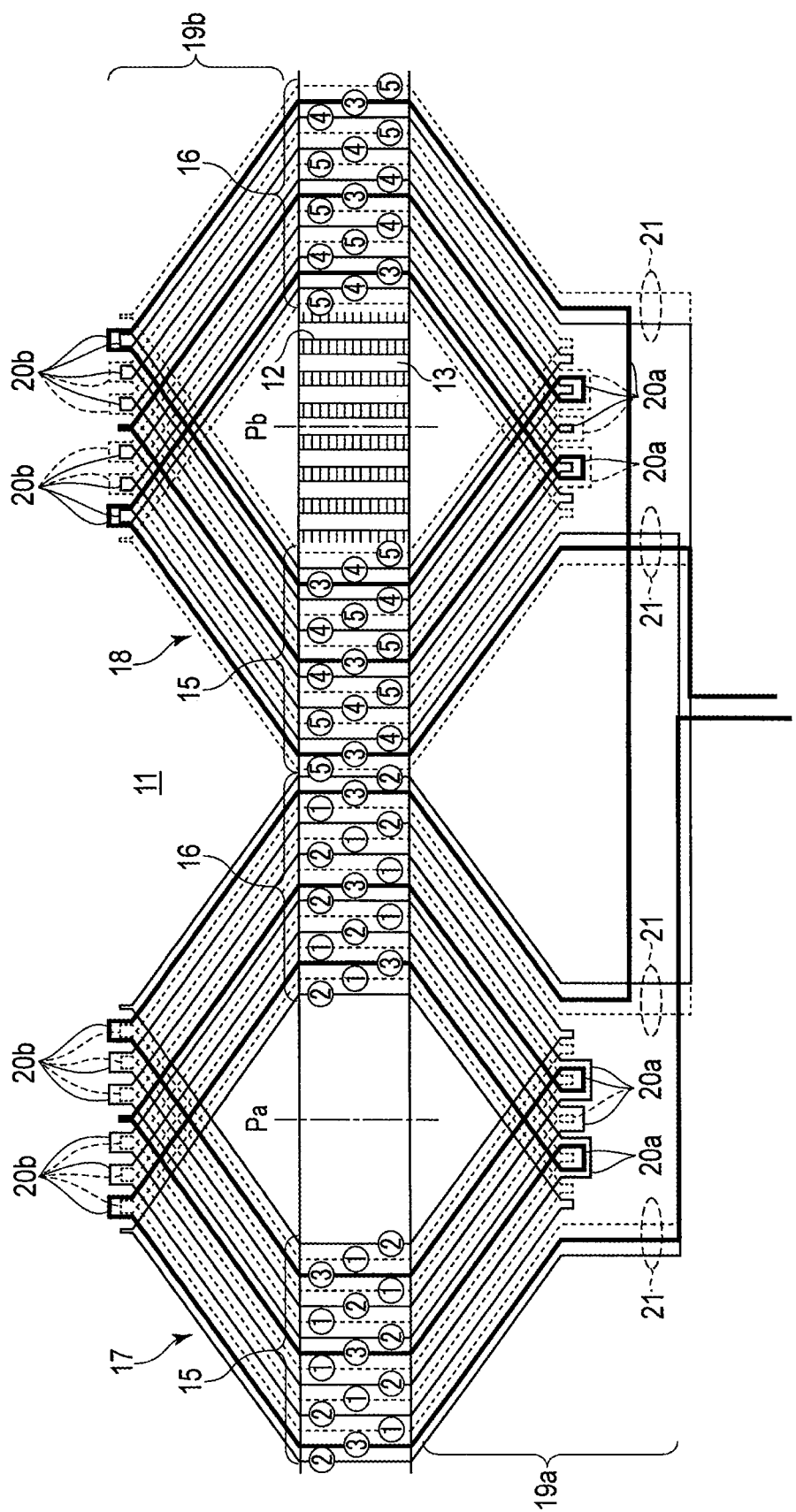
FIG. 13 is a developed perspective view illustrating a part of an armature winding of a rotating electrical machine for two poles/one phase according to a thirteenth embodiment.

FIG. 13 is a developed perspective view illustrating a part of an armature winding of a rotating electrical machine for two poles/one phase according to a thirteenth embodiment.

As illustrated in FIG. 13, thirteen jumper wires 20*a* per phase are provided in the connection side coil ends 19*a* of the phase belts 17 and 18, and twenty four jumper wires 20*b* per phase are provided in the counter-connection side coil ends 19*b*. In addition, in the first phase belt 17, the circuits of the upper and lower coil pieces 15 and 16 are numbered "2, 1, 3, 1, 2, 1, 2, 3, 1, 2, 1, 2, 1, 3, 2" sequentially from the pole center. In the second phase belt 18, the circuits of upper and lower coil pieces 15 and 16 are numbered "5, 4, 3, 4, 5, 4, 5, 3, 4, 5, 4, 5, 4, 3, 5" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 37.

TABLE 37

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | | 1 | | 1 | | 1 | | |
| | Lower coil piece | | 1 | | 1 | | 1 | | |
| Parallel circuits 2, 5 | Upper coil piece | 1 | | | | 1 | | 1 | |
| | Lower coil piece | 1 | | | | 1 | | 1 | |
| Parallel circuit 3 | Upper coil piece | | | 1 | | | | | 1 |
| | Lower coil piece | | | 1 | | | | | 1 |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | | 1 | | 1 | | |
| | Lower coil piece | 1 | | 1 | | 1 | | |
| Parallel circuits 2, 5 | Upper coil piece | | 1 | | 1 | | | 1 |
| | Lower coil piece | | 1 | | 1 | | | 1 |
| Parallel circuit 3 | Upper coil piece | | | | | | 1 | |
| | Lower coil piece | | | | | | 1 | |

As shown in Table 37, for each of the first and fourth parallel circuits, six upper and lower coil pieces 15 and 16 are placed in the 2nd, 4th, 6th, 9th, 11th, and 13th positions from the pole center. For each of the second and fifth parallel circuits, six upper and lower coil pieces 15 and 16 are placed in the 1st, 5th, 7th, 10th, 12th, and 15th positions from the pole center. For the third parallel circuit, three upper and lower coil pieces 15 and 16 are placed in the 3rd, 8th, and 14th positions from the pole center.

Table 38 shows the degree of balance of the voltage generated from the armature winding according to the thirteenth embodiment. Meanwhile, according to the thirteenth embodiment, the degree of balance varies depending on a coil pitch. Therefore, in Table 38, the coil pitch is set to "37/45 (82.22%)." As shown in Table 38, in the armature winding according to the thirteenth embodiment, a voltage deviation (a deviation of a p.u. voltage from 1.0) is "0.2242%" at most, and a phase angle deviation is "0.00°." It is recognized that these values satisfy the requirement of Habermann's patent, in which the voltage deviation be "0.4%" or smaller, and the phase angle deviation be "0.15° " or smaller.

TABLE 38

| | Parallel circuit | | | | |
|---|---|---|---|---|---|
| | 1 | 2 | 3 | 4 | 5 |
| Voltage [p.u.] | 0.9986 | 1.0003 | 1.0022 | 0.9986 | 1.0003 |
| Voltage phase [°] | 0.0000 | 0.0000 | 0.0000 | 0.0000 | 0.0000 |

Table 39 shows a change in the maximum values of the voltage deviation and the phase angle deviation depending on a coil pitch according to the thirteenth embodiment. When the coil pitch is within a range of 36/45 to 41/45, the voltage deviation satisfies the requirement of Habermann's patent, in which the voltage deviation be "0.4%" or smaller, and the phase angle deviation be "0.15° " or smaller.

TABLE 39

| | Coil pitch | | | |
|---|---|---|---|---|
| | 35/45 | 36/45 | 37/45 | 38/45 |
| Voltage Deviation [%] | 0.4141 | 0.3104 | 0.2242 | 0.1397 |
| Phase angle Deviation [°] | 0.0000 | 0.0000 | 0.0000 | 0.0000 |

| | Coil pitch | | | |
|---|---|---|---|---|
| | 39/45 | 40/45 | 41/45 | 42/45 |
| Voltage Deviation [%] | 0.1475 | 0.2468 | 0.3729 | 0.4977 |
| Phase angle Deviation [°] | 0.0000 | 0.0000 | 0.0000 | 0.0000 |

As illustrated in FIG. 13, the connection-side jumper wire 20*a* is not connected to the coil piece positioned in the vicinity of the coil piece connected to the lead-out connection conductor 21. Therefore, the connection-side jumper wire 20*a* and the lead-out connection conductor 21 do not easily interfere with each other. Accordingly, it is possible to more easily perform a work for connecting the connection-side jumper wire 20*a* or the lead-out connection conductor 21 and prevent a failure in the coil connection or an insulation failure. In addition, it is possible to provide a rotating electrical machine having higher reliability.

As described above, according to the thirteenth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Fourteenth Embodiment

Next, a fourteenth embodiment will be described with reference to FIG. 14. Here, the parts common to those of the first embodiment described above (FIG. 1) will not be repeatedly described, and the description will focus on the different parts.

Figure 14:
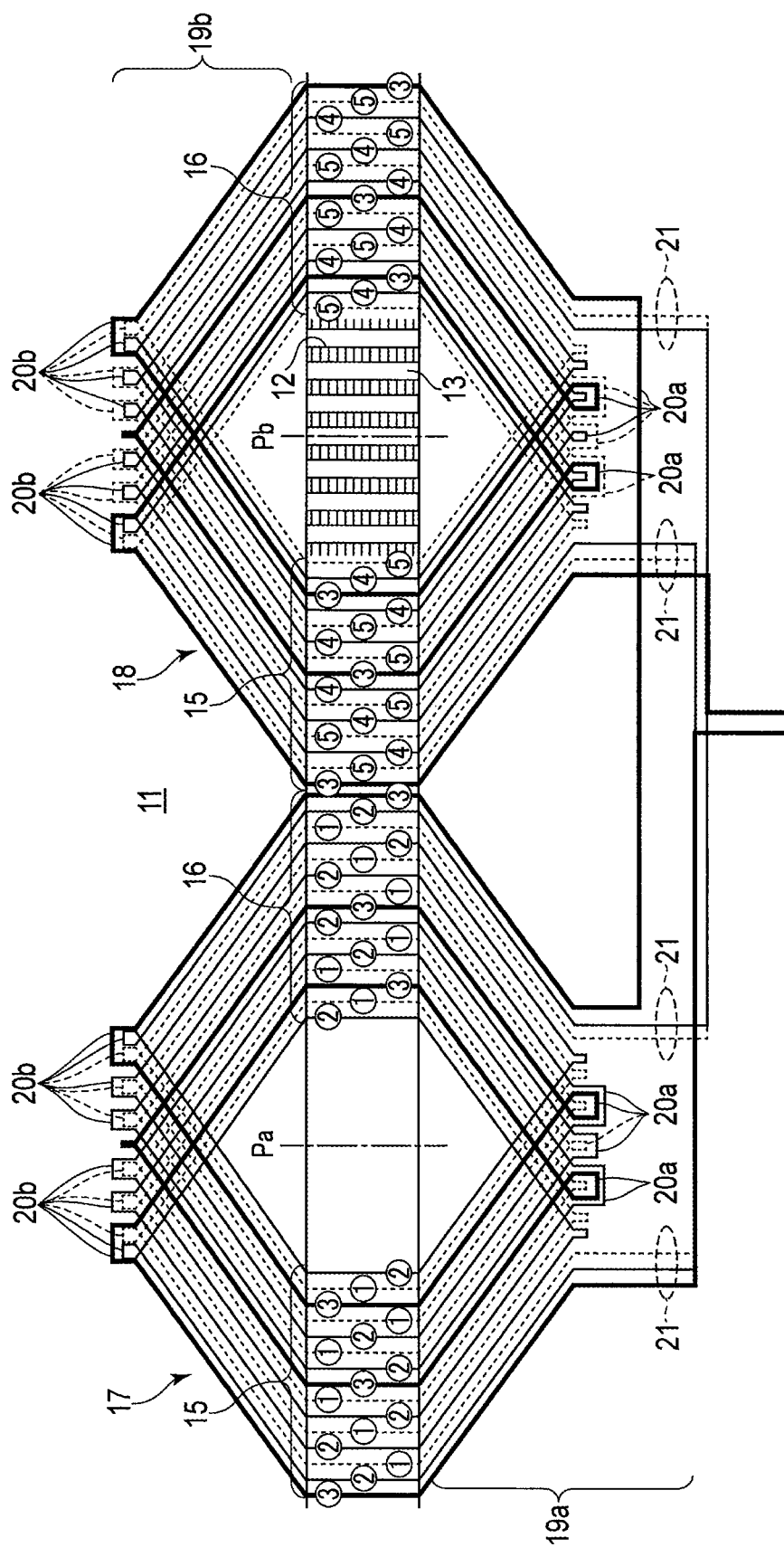
FIG. 14 is a developed perspective view illustrating a part of an armature winding of a rotating electrical machine for two poles/one phase according to a fourteenth embodiment.

FIG. 14 is a developed perspective view illustrating a part of an armature winding of a rotating electrical machine for two poles/one phase according to a fourteenth embodiment.

As illustrated in FIG. 14, thirteen jumper wires 20a per phase are provided in the connection side coil ends 19a of the phase belts 17 and 18, and twenty eight jumper wires 20b per phase are provided in the counter-connection side coil ends 19b. In addition, in the first phase belt 17, the circuits of the upper and lower coil pieces 15 and 16 are numbered "2, 1, 3, 1, 2, 1, 2, 3, 1, 2, 1, 2, 1, 2, 3" sequentially from the pole center. In the second phase belt 18, the circuits of upper and lower coil pieces 15 and 16 are numbered "5, 4, 3, 4, 5, 4, 5, 3, 4, 5, 4, 5, 4, 5, 3" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 40.

TABLE 40

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | | 1 | | 1 | | 1 | | |
| | Lower coil piece | | 1 | | 1 | | 1 | | |
| Parallel circuits 2, 5 | Upper coil piece | 1 | | | | 1 | | 1 | |
| | Lower coil piece | 1 | | | | 1 | | 1 | |
| Parallel circuit 3 | Upper coil piece | | | 1 | | | | | 1 |
| | Lower coil piece | | | 1 | | | | | 1 |

| | | Relative positions from pole center | | | | | |
|---|---|---|---|---|---|---|---|
| | | 9 | 10 | 11 | 12 | 13 | 14 | 15 |
| Parallel circuits 1, 4 | Upper coil piece | 1 | | 1 | | 1 | | |
| | Lower coil piece | 1 | | 1 | | 1 | | |
| Parallel circuits 2, 5 | Upper coil piece | | 1 | | 1 | | 1 | |
| | Lower coil piece | | 1 | | 1 | | 1 | |
| Parallel circuit 3 | Upper coil piece | | | | | | | 1 |
| | Lower coil piece | | | | | | | 1 |

As shown in Table 40, for each of the first and fourth parallel circuits, six upper and lower coil pieces 15 and 16 are placed in the 2nd, 4th, 6th, 9th, 11th, and 13th positions from the pole center. For each of the second and fifth parallel circuits, six upper and lower coil pieces 15 and 16 are placed in the 1st, 5th, 7th, 10th, 12th, and 14th positions from the pole center. For the third parallel circuit, three upper and lower coil pieces 15 and 16 are placed in the 3rd, 8th, and 15th positions from the pole center.

Table 41 shows the degree of balance of the voltage generated from the armature winding according to the fourteenth embodiment. Meanwhile, according to the fourteenth embodiment, the degree of balance varies depending on a coil pitch. Therefore, in Table 41, the coil pitch is set to "37/45 (82.22%)." As shown in Table 41, in the armature winding according to the fourteenth embodiment, a voltage deviation (a deviation of a p.u. voltage from 1.0) is "0.2500%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 41

| | Parallel circuit | | | | |
|---|---|---|---|---|---|
| | 1 | 2 | 3 | 4 | 5 |
| Voltage [p.u.] | 0.9986 | 1.0025 | 0.9978 | 0.9986 | 1.0025 |
| Voltage phase [°] | 0.0000 | 0.0000 | 0.0000 | 0.0000 | 0.0000 |

Table 42 shows a change in the maximum values of the voltage deviation and the phase angle deviation depending on a coil pitch according to the fourteenth embodiment. When the coil pitch is within a range of 36/45 to 38/45, the voltage deviation satisfies the requirement of Habermann's patent, in which the voltage deviation be "0.4%" or smaller, and the phase angle deviation be "0.15°" or smaller.

TABLE 42

| | Coil pitch | | | | |
|---|---|---|---|---|---|
| | 35/45 | 36/45 | 37/45 | 38/45 | 39/45 |
| Voltage Deviation [%] | 0.4141 | 0.2996 | 0.2500 | 0.3823 | 0.5458 |
| Phase angle Deviation [°] | 0.0000 | 0.0000 | 0.0000 | 0.0000 | 0.0000 |

As illustrated in FIG. 14, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the fourteenth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Fifteenth Embodiment

Next, a fifteenth embodiment will be described with reference to FIG. 15. Here, the parts common to those of the first embodiment described above (FIG. 1) will not be repeatedly described, and the description will focus on the different parts.

Figure 15:
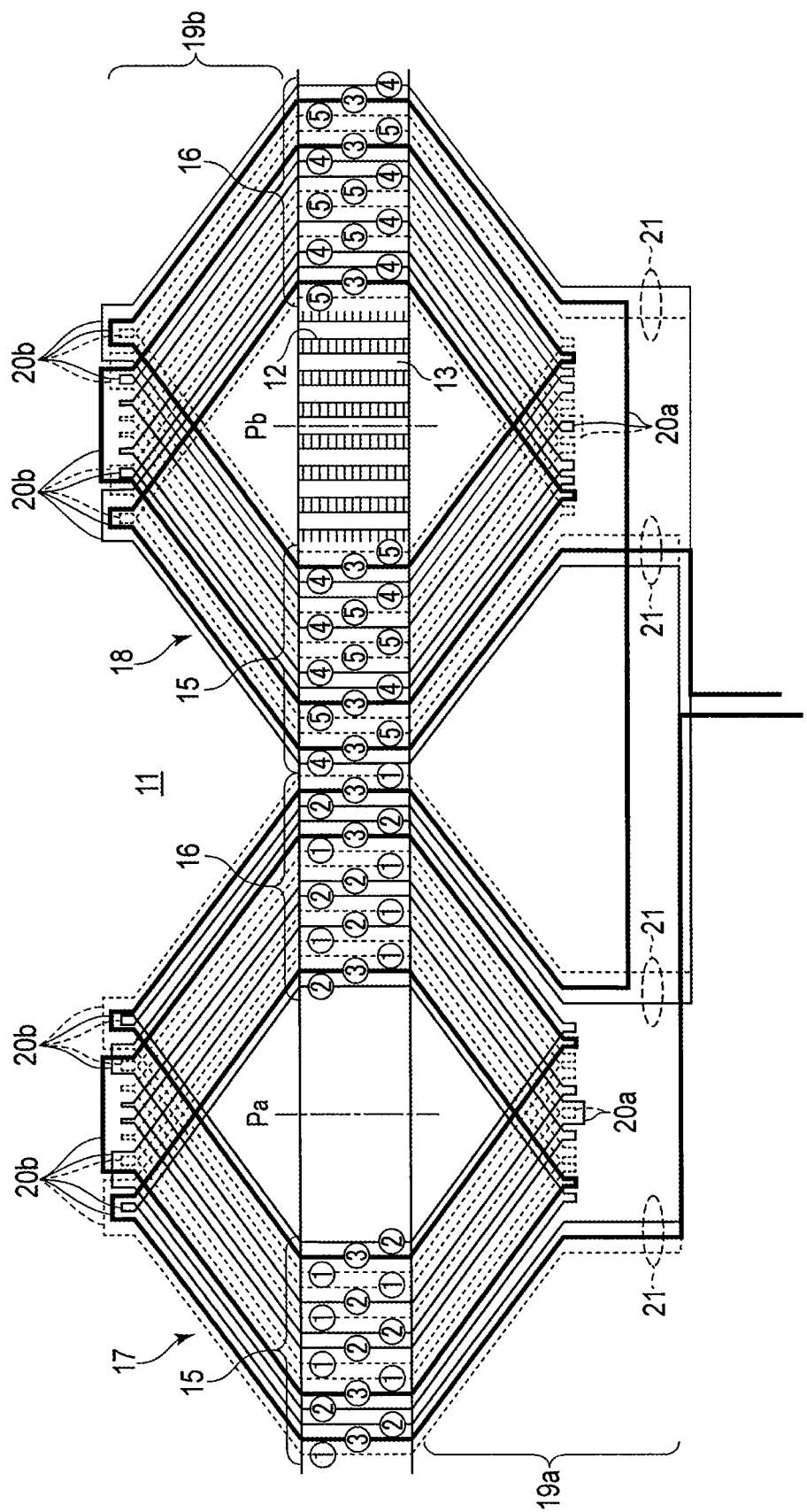
FIG. 15 is a developed perspective view illustrating a part of an armature winding of a rotating electrical machine for two poles/one phase according to a fifteenth embodiment.

FIG. 15 is a developed perspective view illustrating a part of an armature winding of a rotating electrical machine for two poles/one phase according to a fifteenth embodiment.

As illustrated in FIG. 15, five jumper wires 20a per phase are provided in the connection side coil ends 19a of the phase belts 17 and 18, and twenty two jumper wires 20b per phase are provided in the counter-connection side coil ends 19b. In addition, in the first phase belt 17, the circuits of the upper and lower coil pieces 15 and 16 are numbered "2, 3, 1, 1, 2, 1, 2, 2, 1, 1, 3, 2, 2, 3, 1" sequentially from the pole center. In the second phase belt 18, the circuits of upper and lower coil pieces 15 and 16 are numbered "5, 3, 4, 4, 5, 4, 5, 5, 4, 4, 3, 5, 5, 3, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 43.

TABLE 43

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | | | 1 | 1 | | 1 | | |
| | Lower coil piece | | | 1 | 1 | | 1 | | |
| Parallel circuits 2, 5 | Upper coil piece | 1 | | | | 1 | | 1 | 1 |
| | Lower coil piece | 1 | | | | 1 | | 1 | 1 |
| Parallel circuit 3 | Upper coil piece | | 1 | | | | | | |
| | Lower coil piece | | 1 | | | | | | |

| | | Relative positions from pole center | | | | | | |
|---|---|---|---|---|---|---|---|---|
| | | 9 | 10 | 11 | 12 | 13 | 14 | 15 |
| Parallel circuits 1, 4 | Upper coil piece | 1 | 1 | | | | | 1 |
| | Lower coil piece | 1 | 1 | | | | | 1 |
| Parallel circuits 2, 5 | Upper coil piece | | | | 1 | 1 | | |
| | Lower coil piece | | | | 1 | 1 | | |
| Parallel circuit 3 | Upper coil piece | | | 1 | | | 1 | |
| | Lower coil piece | | | 1 | | | 1 | |

As shown in Table 43, for each of the first and fourth parallel circuits, six upper and lower coil pieces 15 and 16 are placed in the 3rd, 4th, 6th, 9th, 10th, and 15th positions from the pole center. For each of the second and fifth parallel circuits, six upper and lower coil pieces 15 and 16 are placed in the 1st, 5th, 7th, 8th, 12th, and 13th positions from the pole center. For the third parallel circuit, three upper and lower coil pieces 15 and 16 are placed in the 2nd, 11th, and 14th positions from the pole center.

Table 44 shows the degree of balance of the voltage generated from the armature winding according to the fifteenth embodiment. Meanwhile, according to the fifteenth embodiment, the degree of balance varies depending on a coil pitch. Therefore, in Table 44, the coil pitch is set to "37/45 (82.22%)." As shown in Table 44, in the armature winding according to the fifteenth embodiment, a voltage deviation (a deviation of a p.u. voltage from 1.0) is "0.1531%" at most, and a phase angle deviation is "0.00°." It is recognized that these values satisfy the requirement of Habermann's patent, in which the voltage deviation be "0.4%" or smaller, and the phase angle deviation be "0.15°" or smaller.

TABLE 44

| | Parallel circuit | | | | |
|---|---|---|---|---|---|
| | 1 | 2 | 3 | 4 | 5 |
| Voltage [p.u.] | 1.0015 | 0.9986 | 0.9998 | 1.0015 | 0.9986 |
| Voltage phase [°] | 0.0000 | 0.0000 | 0.0000 | 0.0000 | 0.0000 |

Table 45 shows a change in the maximum values of the voltage deviation and the phase angle deviation depending on a coil pitch according to the fifteenth embodiment. When the coil pitch is within a range of 36/45 to 38/45, the voltage deviation satisfies the requirement of Habermann's patent, in which the voltage deviation be "0.4%" or smaller, and the phase angle deviation be "0.15°" or smaller.

TABLE 45

| | Coil pitch | | | | |
|---|---|---|---|---|---|
| | 35/45 | 36/45 | 37/45 | 38/45 | 39/45 |
| Voltage Deviation [%] | 0.5424 | 0.2590 | 0.1531 | 0.2895 | 0.5563 |
| Phase angle Deviation [°] | 0.0000 | 0.0000 | 0.0000 | 0.0000 | 0.0000 |

As illustrated in FIG. 15, the connection-side jumper wire 20a is not connected to the coil piece positioned in the vicinity of the coil piece connected to the lead-out connection conductor 21. Therefore, the connection-side jumper wire 20a and the lead-out connection conductor 21 do not easily interfere with each other. Accordingly, it is possible to more easily perform a work for connecting the connection-side jumper wire 20a or the lead-out connection conductor 21 and prevent a failure in the coil connection or an insulation failure. In addition, it is possible to provide a rotating electrical machine having higher reliability.

As described above, according to the fifteenth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Sixteenth Embodiment

Next, a sixteenth embodiment will be described with reference to FIG. 16. Here, the parts common to those of the first embodiment described above (FIG. 1) will not be repeatedly described, and the description will focus on the different parts.

Figure 16:
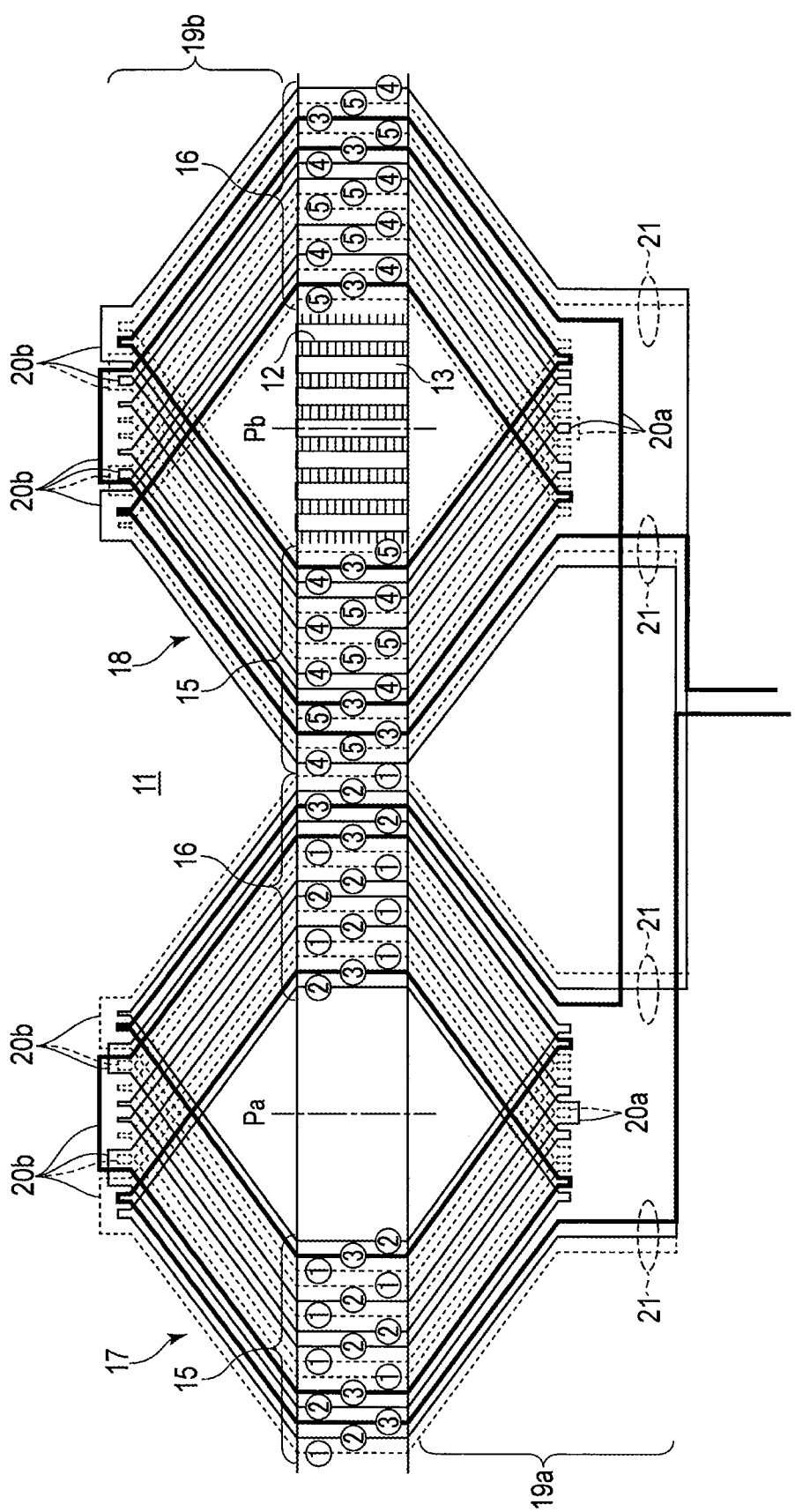
FIG. 16 is a developed perspective view illustrating a part of an armature winding of a rotating electrical machine for two poles/one phase according to a sixteenth embodiment.
Figure 17:
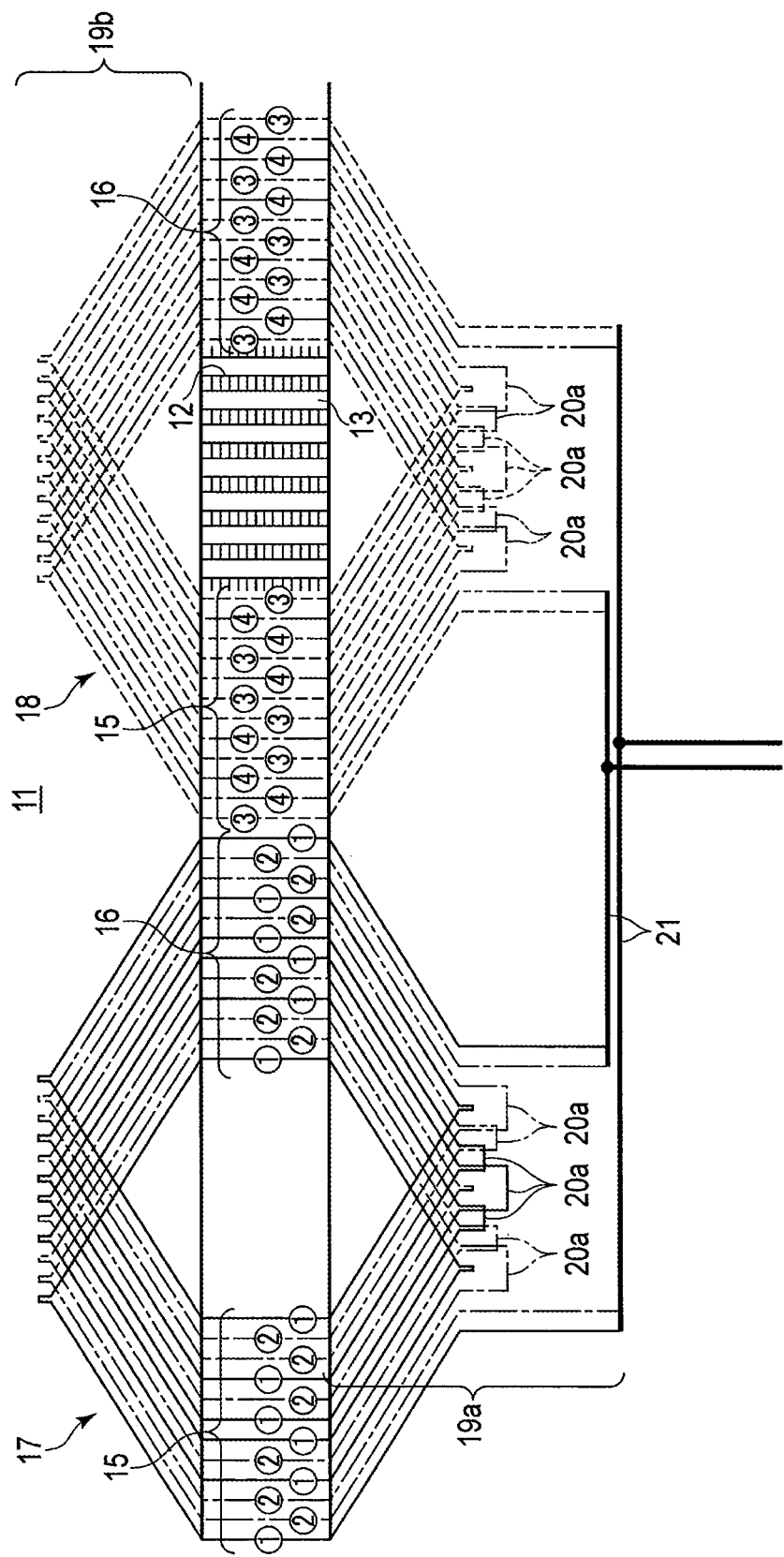
FIG. 17 is a developed perspective view illustrating a part of an armature winding of a rotating electrical machine for two poles/one phase according to prior art.
Figure 18:
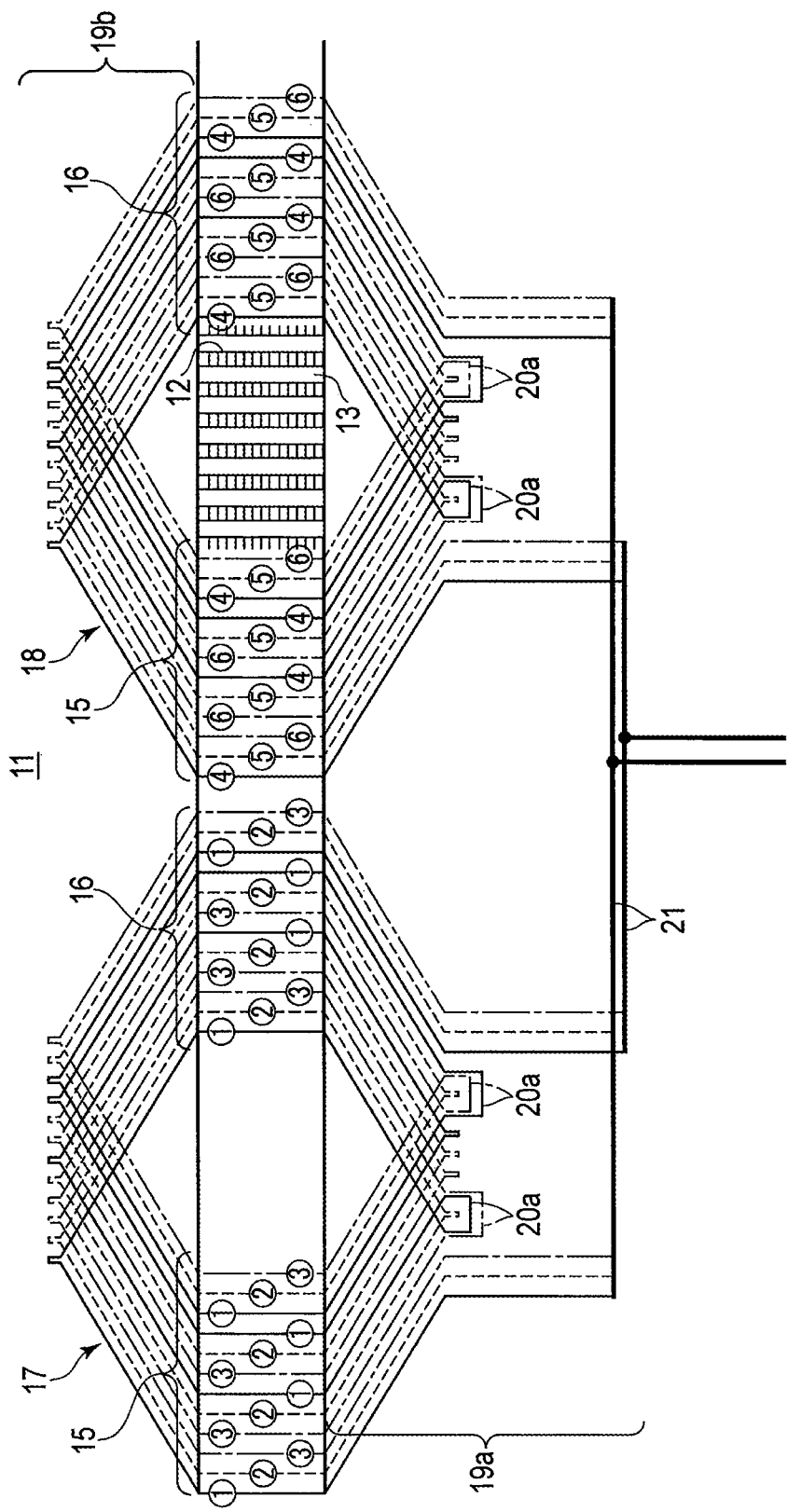
FIG. 18 is a developed perspective view illustrating a part of an armature winding of a rotating electrical machine for two poles/one phase according to prior art.

FIG. 16 is a developed perspective view illustrating a part of an armature winding of a rotating electrical machine for two poles/one phase according to a sixteenth embodiment.

As illustrated in FIG. 16, five jumper wires 20a per phase are provided in the connection side coil ends 19a of the phase belts 17 and 18, and fourteen jumper wires 20b per phase are provided in the counter-connection side coil ends 19b. In addition, in the first phase belt 17, the circuits of the upper and lower coil pieces 15 and 16 are numbered "2, 3, 1, 1, 2, 1, 2, 2, 1, 1, 3, 2, 3, 2, 1" sequentially from the pole center. In the second phase belt 18, the circuits of upper and lower coil pieces 15 and 16 are numbered "5, 3, 4, 4, 5, 4, 5, 5, 4, 4, 3, 5, 3, 5, 4" sequentially from the pole center.

As a result, if the relative positions of the upper and lower coil pieces 15 and 16 in the phase belt are expressed by positions from the pole center, the upper and lower coil pieces 15 and 16 of each parallel circuit are placed as shown in Table 46.

TABLE 46

| | | Relative positions from pole center | | | | | | | |
|---|---|---|---|---|---|---|---|---|---|
| | | 1 | 2 | 3 | 4 | 5 | 6 | 7 | 8 |
| Parallel circuits 1, 4 | Upper coil piece | | | 1 | 1 | | 1 | | |
| | Lower coil piece | | | 1 | 1 | | 1 | | |
| Parallel circuits 2, 5 | Upper coil piece | 1 | | | | 1 | | 1 | 1 |
| | Lower coil piece | 1 | | | | 1 | | 1 | 1 |
| Parallel | Upper coil piece | | 1 | | | | | | |

TABLE 46-continued

| circuit 3 | Lower coil piece | 1 | | | | | |
|---|---|---|---|---|---|---|---|
| | | Relative positions from pole center | | | | | |
| | | 9 | 10 | 11 | 12 | 13 | 14 | 15 |
| Parallel | Upper coil piece | 1 | 1 | | | | | 1 |
| circuits 1, 4 | Lower coil piece | 1 | 1 | | | | | 1 |
| Parallel | Upper coil piece | | | | 1 | | 1 | |
| circuits 2, 5 | Lower coil piece | | | | 1 | | 1 | |
| Parallel | Upper coil piece | | | 1 | | 1 | | |
| circuit 3 | Lower coil piece | | | 1 | | 1 | | |

As shown in Table 46, for each of the first and fourth parallel circuits, six upper and lower coil pieces 15 and 16 are placed in the 3rd, 4th, 6th, 9th, 10th, and 15th positions from the pole center. For each of the second and fifth parallel circuits, six upper and lower coil pieces 15 and 16 are placed in the 1st, 5th, 7th, 8th, 12th, and 14th positions from the pole center. For the third parallel circuit, three upper and lower coil pieces 15 and 16 are placed in the 2nd, 11th, and 13th positions from the pole center.

Table 47 shows the degree of balance of the voltage generated from the armature winding according to the sixteenth embodiment. Meanwhile, according to the sixteenth embodiment, the degree of balance varies depending on a coil pitch. Therefore, in Table 47, the coil pitch is set to "37/45 (82.22%)." As shown in Table 47, in the armature winding according to the sixteenth embodiment, a voltage deviation (a deviation of a p.u. voltage from 1.0) is "0.2765%" at most, and a phase angle deviation is "0.00°." It is recognized that these values satisfy the requirement of Habermann's patent, in which the voltage deviation be "0.4%" or smaller, and the phase angle deviation be "0.15° " or smaller.

TABLE 47

| | Parallel circuit | | | | |
|---|---|---|---|---|---|
| | 1 | 2 | 3 | 4 | 5 |
| Voltage [p.u.] | 1.0015 | 0.9972 | 1.0025 | 1.0015 | 0.9972 |
| Voltage phase [°] | 0.0000 | 0.0000 | 0.0000 | 0.0000 | 0.0000 |

Table 48 shows a change in the maximum values of the voltage deviation and the phase angle deviation depending on a coil pitch according to the sixteenth embodiment. When the coil pitch is within a range of 37/45 to 40/45, the voltage deviation satisfies the requirement of Habermann's patent, in which the voltage deviation be "0.4%" or smaller, and the phase angle deviation be "0.15° " or smaller.

TABLE 48

| | Coil pitch | | |
|---|---|---|---|
| | 36/45 | 37/45 | 38/45 |
| Voltage Deviation [%] | 0.4377 | 0.2765 | 0.2342 |
| Phase angle Deviation [°] | 0.0000 | 0.0000 | 0.0000 |

| | Coil pitch | | |
|---|---|---|---|
| | 39/45 | 40/45 | 41/45 |
| Voltage Deviation [%] | 0.2546 | 0.3049 | 0.4837 |
| Phase angle Deviation [°] | 0.0000 | 0.0000 | 0.0000 |

As illustrated in FIG. 16, the connection-side jumper wire 20*a* is not connected to the coil piece positioned in the vicinity of the coil piece connected to the lead-out connection conductor 21. Therefore, the connection-side jumper wire 20*a* and the lead-out connection conductor 21 do not easily interfere with each other. Accordingly, it is possible to more easily perform a work for connecting the connection-side jumper wire 20*a* or the lead-out connection conductor 21 and prevent a failure in the coil connection or an insulation failure. In addition, it is possible to provide a rotating electrical machine having higher reliability.

As described above, according to the sixteenth embodiment, it is possible to realize the degree of balance satisfying the requirement of Habermann's patent regarding the voltages of the parallel circuits and reduce a circulating current.

Note that the embodiment is not limited to the configuration described above. For example, the jumper wire positions may be set differently from those described above, or the coil pieces located in electrically equivalent positions may be exchanged between the parallel circuits 1 and 4.

Common Features Throughout First to Sixteenth Embodiments

Structural features common to the armature windings throughout the first to sixteenth embodiments will be presented below.

There is provided a 3-phase even-numbered-pole 2-layered armature winding housed in 45 slots per pole provided in a laminated iron core.

Five parallel circuits are provided for each phase of the winding and divided into a pair of phase belts including first and second phase belts 17 and 18, each parallel circuit including upper and lower coil pieces 15 and 16 which are connected to each other in series in a connection side coil end 19*a* and a counter-connection side coil end 19*b*.

The coil pieces corresponding to first and second parallel circuits are arranged in the first phase belt 17, and the coil pieces corresponding to fourth and fifth parallel circuits are arranged in the second phase belt 18. In addition, the coil pieces corresponding to the third parallel circuit are arranged in the first and second phase belts 17 and 18.

the upper coil pieces 15 and the lower coil pieces 16 of each parallel circuit are placed in same-numbered positions from a pole center.

One of the coil pieces corresponding to the third parallel circuit in the first phase belt 17 and one of the coil pieces corresponding to the third parallel circuit in the second phase belt 18 are connected to each other through a single jumper wire 20*a*. Specifically, a coil piece of the third parallel circuit placed in the vicinity of a single upper or lower coil piece 15 or 16 (for example, the lower coil piece 16) corresponding to the first or second parallel circuit in the first phase belt 17 connected to the lead-out connection conductor 21 communicating with the lead-out portion and a coil piece of the third parallel circuit placed in the vicinity of a single upper or lower coil piece 15 or 16 (for example, lower coil piece 16) corresponding to the fourth or fifth parallel circuit in the second phase belt 18 connected to the lead-out connection conductor 21 communicating with the lead-out portion are connected to each other through a single jumper wire 20*a*.

As described above, according to each embodiment, it is possible to provide a highly reliable armature winding structure having a number of slots suitable for an indirect cooling type large-capacity rotating electrical machine.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made. The accompanying claims and their equivalents are intended to cover such forms or modifications as would fall within the scope of the inventions.

The invention claimed is:

1. A three-phase even-numbered-pole two-layered armature winding housed in forty five slots per pole provided in a laminated iron core of a rotating electrical machine, comprising:
five parallel circuits provided for each phase of the winding and divided into a pair of phase belts including first and second phase belts, each parallel circuit including upper and lower coil pieces which are connected to each other in series in a connection side coil end and a counter-connection side coil end,
wherein coil pieces corresponding to first and second parallel circuits are arranged in the first phase belt,
coil pieces corresponding to fourth and fifth parallel circuits are arranged in the second phase belt,
coil pieces corresponding to the third parallel circuit are arranged in the first and second phase belts, and
the upper coil pieces and the lower coil pieces of each parallel circuit are placed in a mirror symmetric arrangement around pole centers.

2. The armature winding of the rotating electrical machine according to claim 1, wherein one of the coil pieces corresponding to the third parallel circuit in the first phase belt and one of the coil pieces corresponding to the third parallel circuit in the second phase belt are connected to each other.

3. The armature winding of the rotating electrical machine according to claim 1, wherein a jumper wire used to connect the coil pieces of the same parallel circuit in the same phase belt to the connection side coil end is connected to several coil pieces excluding the coil piece connected to the lead-out connection conductor and coil pieces placed in the vicinity of the coil piece connected to the lead-out connection conductor.

4. The armature winding of the rotating electrical machine according to claim 1, wherein the upper and lower coil pieces of the first and fourth parallel circuits are placed in the 1st, 5th, 6th, 10th, 11th, and 15th positions from the pole centers,
the upper and lower coil pieces of the second and fifth parallel circuits are placed in the 2nd, 4th, 7th, 9th, 12th, and 14th positions from the pole centers, and
the upper and lower coil pieces of the third parallel circuit are placed in the 3rd, 8th, and 13th positions from the pole centers.

5. The armature winding of the rotating electrical machine according to claim 1, wherein the upper and lower coil pieces of the first and fourth parallel circuits are placed in the 1st, 5th, 7th, 9th, 11th, and 15th positions from the pole centers;
the upper and lower coil pieces of the second and fifth parallel circuits are placed in the 2nd, 4th, 6th, 10th, 12th, and 14th positions from the pole centers, and
the upper and lower coil pieces of the third parallel circuit are placed in the 3rd, 8th, and 13th positions from the pole centers.

6. The armature winding of the rotating electrical machine according to claim the upper and lower coil pieces of the first and fourth parallel circuits are placed in the 1st, 6th, 7th, 9th, 10th, and 15th positions from the pole centers,
the upper and lower coil pieces of the second and fifth parallel circuits are placed in the 2nd, 4th, 5th, 11th, 12th, and 14th positions from the pole centers, and
the upper and lower coil pieces of the third parallel circuit are placed in the 3rd, 8th, and 13th positions from the pole centers.

7. The armature winding of the rotating electrical machine according to claim 1, wherein the upper and lower coil pieces of the first and fourth parallel circuits are placed in the 1st, 6th, 7th, 9th, 10th, and 15th positions from the pole centers,
the upper and lower coil pieces of the second and fifth parallel circuits are placed in the 3rd, 4th, 5th, 8th, 11th, and 12th positions from the pole center, and
the upper and lower coil pieces of the third parallel circuit are placed in the 2nd, 13th, and 14th positions from the pole centers.

8. The armature winding of the rotating electrical machine according to claim 1, wherein the upper and lower coil pieces of the first and fourth parallel circuits are placed in the 1st, 6th, 7th, 9th, 10th, and 15th positions from the pole centers,
the upper and lower coil pieces of the second and fifth parallel circuits are placed in the 3rd, 4th, 5th, 8th, 12th, and 13th positions from the pole centers, and
the upper and lower coil pieces of the third parallel circuit are placed in the 2nd, 11th, and 14th positions from the pole centers.

9. The armature winding of the rotating electrical machine according to claim 1, wherein the upper and lower coil pieces of the first and fourth parallel circuits are placed in the 1st, 6th, 7th, 8th, 12th, and 15th positions from the pole centers,
the upper and lower coil pieces of the second and fifth parallel circuits are placed in the 3rd, 4th, 5th, 9th, 10th, and 13th positions from the pole centers, and
the upper and lower coil pieces of the third parallel circuit are placed in the 2nd, 11th and 14th positions from the pole centers.

10. The armature winding of the rotating electrical machine according to claim 1, wherein the upper and lower coil pieces of the first and fourth parallel circuits are placed in the 1st, 4th, 8th, 9th, 12th, and 13th positions from the pole centers,
the upper and lower coil pieces of the second and fifth parallel circuits are placed in the 3rd, 5th, 6th, 7th, 10th, and 15th positions from the pole centers, and
the upper and lower coil pieces of the third parallel circuit are placed in the 2nd, 11th, and 14th positions from the pole centers.

11. The armature winding of the rotating electrical machine according to claim 1, wherein the upper and lower coil pieces of the first and fourth parallel circuits are placed in the 1st, 6th, 7th, 9th, 12th, and 15th positions from the pole centers,
the upper and lower coil pieces of the second and fifth parallel circuits are placed in the 3rd, 4th, 5th, 8th, 10th, and 13th positions from the pole centers, and
the upper and lower coil pieces of the third parallel circuit are placed in the 2nd, 11th, and 14th positions from the pole centers.

12. The armature winding of the rotating electrical machine according to claim 1, wherein the upper and lower coil pieces of the first and fourth parallel circuits are placed in the 1st, 3rd, 9th, 10th, 12th, and 13th positions from the pole centers, the upper and lower coil pieces of the second and fifth parallel circuits are placed in the 4th, 5th, 6th, 7th, 8th, and 15th positions from the pole centers, and the upper and lower coil pieces of the third parallel circuit are placed in the 2nd, 11th, and 14th positions from the pole centers.

13. The armature winding of the rotating electrical machine according to claim 1, wherein the upper and lower coil pieces of the first and fourth parallel circuits are placed in the 1st, 4th, 9th, 10th, 12th, and 15th positions from the pole centers, the upper and lower coil pieces of the second and fifth parallel circuits are placed in the 3rd, 5th, 6th, 7th, 8th, and 13th positions from the pole centers, and the upper and lower coil pieces of the third parallel circuit are placed in the 2nd, 11th, and 14th positions from the pole centers.

14. The armature winding of the rotating electrical machine according to claim 1, wherein the upper and lower coil pieces of the first and fourth parallel circuits are placed in the 1st, 5th, 7th, 9th, 12th, and 15th positions from the pole centers, the upper and lower coil pieces of the second and fifth parallel circuits are placed in the 3rd, 4th, 6th, 8th, 10th, and 13th positions from the pole centers, and the upper and lower coil pieces of the third parallel circuit are placed in the 2nd, 11th, and 14th positions from the pole centers.

15. The armature winding of the rotating electrical machine according to claim 1, wherein the upper and lower coil pieces of the first and fourth parallel circuits are placed in the 2nd, 4th, 7th, 9th, 11th, and 14th positions from the pole centers, the upper and lower coil pieces of the second and fifth parallel circuits are placed in the 1st, 5th, 6th, 10th, 12th, and 13th positions from the pole centers, and the upper and lower coil pieces of the third parallel circuit are placed in the 3rd, 8th, and 15th positions from the pole centers.

16. The armature winding of the rotating electrical machine according to claim 1, wherein the upper and lower coil pieces of the first and fourth parallel circuits are placed in the 2nd, 4th, 6th, 9th, 11th, and 13th positions from the pole centers, the upper and lower coil pieces of the second and fifth parallel circuits are placed in xe 1st, 5th, 7th, 10th, 12th, and 15th positions from the pole centers, and the upper and lower coil pieces of the third parallel circuit are placed in the 3rd, 8th, and 14th positions from the pole centers.

17. The armature winding of the rotating electrical machine according to claim wherein the upper and lower coil pieces of the first and fourth parallel circuits are placed in the 2nd, 4th, 6th, 9th, 11th, and 13th positions from the pole centers, the upper and lower coil pieces of the second and fifth parallel circuits are placed in the 1st, 5th, 7th, 10th, 12th, and 14th positions from the pole centers, and the upper and lower coil pieces of the third parallel circuit are placed in the 3rd, 8th, and 15th positions from the pole centers.

18. The armature winding of the rotating electrical machine according to claim 1, wherein the upper and lower coil pieces of the first and fourth parallel circuits are placed in the 3rd, 4th, 6th, 9th, 10th, and 15th positions from the pole centers, the upper and lower coil pieces of the second and fifth parallel circuits are placed in the 1st, 5th, 7th, 8th, 12th, and 13th positions from the pole centers, and the upper and lower coil pieces of the third parallel circuit are placed in the 2nd, 11th, and 14th positions from the pole centers.

19. The armature winding of the rotating electrical machine according to claim 1, wherein the upper and lower coil pieces of the first and fourth parallel circuits are placed in the 3rd, 4th, 6th, 9th, 10th, and 15th positions from the pole centers, the upper and lower coil pieces of the second and fifth parallel circuits are placed in the 1st, 5th, 7th, 8th, 12th, and 14th positions from the pole centers, and the upper and lower coil pieces of the third parallel circuit are placed in the 2nd, 11th, and 13th positions from the pole centers.

* * * * *